(12) United States Patent
Tomikawa et al.

(10) Patent No.: US 11,378,830 B2
(45) Date of Patent: Jul. 5, 2022

(54) METHOD OF DRIVING DISPLAY DEVICE, AND DISPLAY DEVICE

(71) Applicant: SEIKO EPSON CORPORATION, Tokyo (JP)

(72) Inventors: Naoki Tomikawa, Fujimi-Machi (JP); Nobutaka Tanaka, Shiojiri (JP); Satoshi Yatabe, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/231,027

(22) Filed: Apr. 15, 2021

(65) Prior Publication Data
US 2021/0325702 A1  Oct. 21, 2021

(30) Foreign Application Priority Data
Apr. 16, 2020  (JP) .............................. JP2020-073346

(51) Int. Cl.
*G02F 1/13* (2006.01)
*G03B 21/00* (2006.01)

(52) U.S. Cl.
CPC ........... *G02F 1/132* (2013.01); *G03B 21/006* (2013.01)

(58) Field of Classification Search
CPC .............. G02F 1/132; G02F 1/133385; G02F 1/133382; G03B 21/006; G03B 21/16
See application file for complete search history.

(56) References Cited

U.S. PATENT DOCUMENTS

| | | |
|---|---|---|
| 2006/0007378 A1 | 1/2006 | Nakao et al. |
| 2014/0368481 A1 | 12/2014 | Tomikawa |
| 2016/0284302 A1 | 9/2016 | Tomikawa et al. |
| 2019/0331957 A1 | 10/2019 | Aoki et al. |

FOREIGN PATENT DOCUMENTS

| | | | |
|---|---|---|---|
| JP | H06138460 | 5/1994 | |
| JP | 2006011423 | 1/2006 | |
| JP | 2009058351 | 3/2009 | |
| JP | 2015001634 | 1/2015 | |
| JP | 2015111247 | 6/2015 | |
| JP | 2019-028257 A | * 2/2019 | ............ G02F 1/133 |
| JP | 2019028257 | 2/2019 | |
| JP | 2019191390 | 10/2019 | |

* cited by examiner

*Primary Examiner* — Donald L Raleigh
(74) *Attorney, Agent, or Firm* — JCIPRNET

(57) ABSTRACT

A projection-type display device includes a liquid crystal device, a transmittance measuring device configured to measure a transmittance of a liquid crystal panel, and a cooling device. After a result of measurement of the transmittance by the transmittance measuring device changes by 10% relative to a default value, a control unit controls the cooling device to raise temperatures of a liquid crystal layer to be not less than 60° C. and not more than a nematic-isotropic phase transition temperature Tni-20° C. This makes it possible to efficiently sweep impurities from a display region to the outside of the display region without heating the liquid crystal layer more than necessary. In addition, a liquid crystal volume ratio V1/V2 of a liquid crystal device for blue among a plurality of liquid crystal devices is greater than that of the other liquid crystal panels, where V1 is a volume of liquid crystal at the inner side of a seal material, and V2 is a volume of the liquid crystal layer in the display region.

8 Claims, 25 Drawing Sheets

METHOD OF DRIVING DISPLAY DEVICE, AND DISPLAY DEVICE

The present application is based on, and claims priority from JP Application Serial Number 2020-073346, filed on Apr. 16, 2020, the disclosure of which is hereby incorporated by reference herein in its entirety.

BACKGROUND

1. Technical Field

The present disclosure relates to a method of driving a display device, and a display device.

2. Related Art

A liquid crystal panel includes an element substrate and a counter substrate affixed to the element substrate with a seal material being interposed therebetween. At the inner side of the seal material, a liquid crystal layer is disposed. In such a liquid crystal panel, impurities may be generated, for example, due to a photochemical reaction when light is emitted onto the liquid crystal layer. These impurities may diffuse due to a difference in concentration between a display region and the outside of the display region, or may leak out of a display region due to flow of a liquid crystal material occurring when the liquid crystal panel is driven. In addition, it is conceived to provide a technique that sweeps ionic impurities out of the display region by using an electric field generated with a trapping electrode provided outside the display region or an electric field generated with a pixel electrode. Furthermore, ionic impurities are prone to be adsorbed by an alignment film. Thus, it is conceived to provide a technique that sweeps ionic impurities out of the display region in a state where adsorption force of the ionic impurities toward the alignment film is weakened by raising temperatures of the liquid crystal layer to be equal to or more than a nematic-isotropic phase transition temperature Tni (see JP-A-2019-28257).

Heating the liquid crystal layer may lead to a problem of hastening deterioration of the liquid crystal material or a problem in that, during a displaying period, it is not possible to raise temperatures to be equal to or more than a nematic-isotropic phase transition temperature Tni, for example. However, this technology does not take into consideration a point as to timing of application of heat to effectively move ionic impurities to the outside the display region. In addition, typically, an increase in the ionic impurities in the display region is not monitored, which leads to a problem in that the liquid crystal layer is heated more than necessary.

SUMMARY

In order to solve the problems described above, one aspect according to the present disclosure provides a method of driving a display device, the method including, after a transmittance of a liquid crystal panel changes by 10%, controlling a temperature of a liquid crystal layer to be not less than 60° C. and not more than a nematic-isotropic phase transition temperature Tni-20° C., and driving the liquid crystal panel.

Another aspect according to the present disclosure provides a display device including a liquid crystal panel including a liquid crystal layer, a transmittance measuring device configured to measure a transmittance of the liquid crystal panel, and a cooling device, in which, after a result of measurement of the transmittance by the transmittance measuring device changes by 10% relative to a default value, the cooling device is controlled to raise a temperature of the liquid crystal layer.

The electric device to which the present disclosure is applied can be used in various types of electronic devices such as a direct-view type display device or a projection-type display device. In a case where the electronic device is a projection-type display device, the projection-type display device includes a light source unit configured to emit light to be supplied to the liquid crystal device, and a projection optical system configured to project light modified by the liquid crystal device.

DESCRIPTION OF EXEMPLARY EMBODIMENTS

Figure 1:
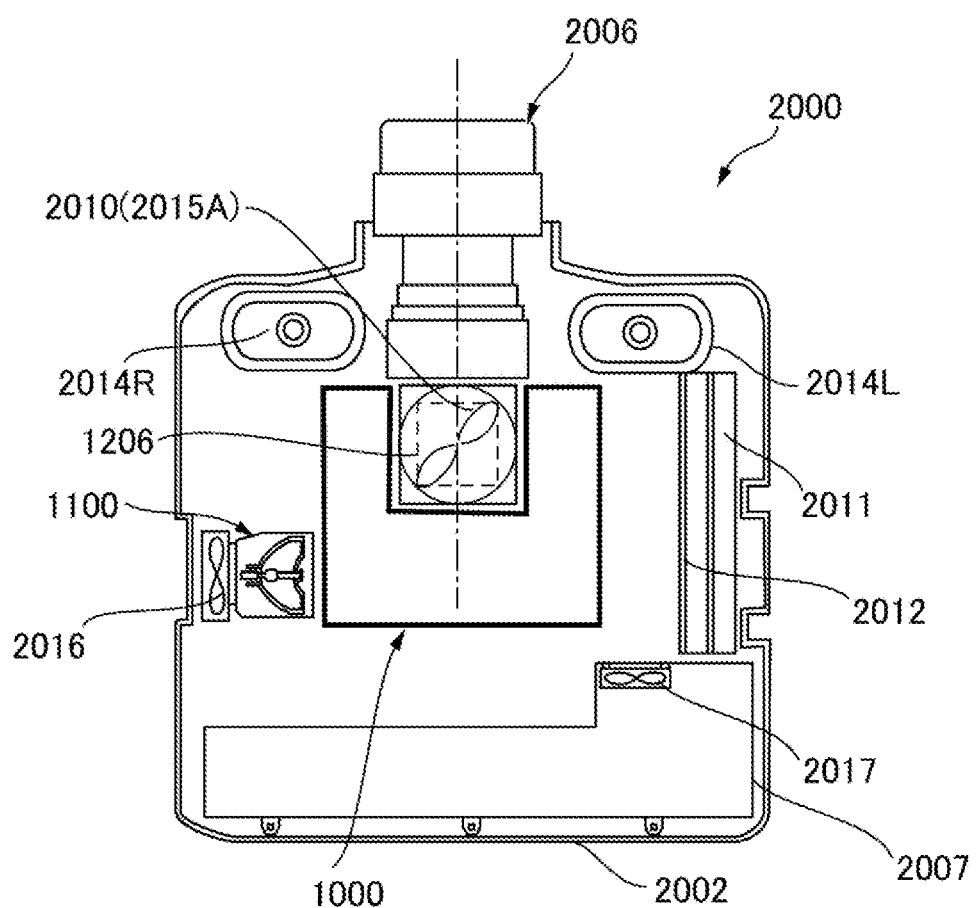
FIG. 1 is an explanatory diagram illustrating a projection-type display device serving as an example of a display device to which the present disclosure is applied.

Below, embodiments according to the present disclosure will be described with reference to the drawings. Note that, in the drawings referred to during the following description, illustration is given in an enlarged or reduced manner as appropriate, so that the portions described can be easily recognized.

First Embodiment

1. Configuration of Projection-Type Display Device

Figure 2:
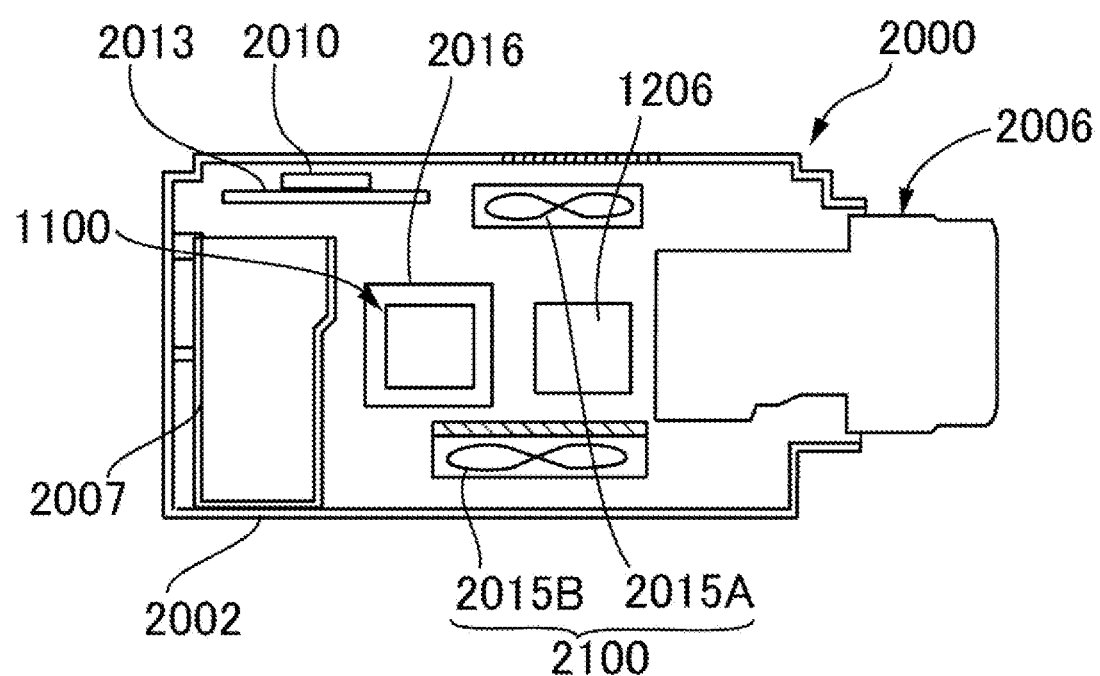
FIG. 2 is an explanatory diagram of a main part of the projection-type display device illustrated in FIG. 1 as viewed from a side.

FIG. 1 is an explanatory diagram illustrating a projection-type display device serving as one example of a display device to which the present disclosure is applied. In FIG. 1, configurations of main portions of the projection-type display device are illustrated in plan view. FIG. 2 is an explanatory diagram illustrating main portions of the projection-type display device illustrated in FIG. 1 as viewed from a side thereof.

Within an outer case 2002 of a projection-type display device 2000 illustrated in FIGS. 1 and 2, a power supply unit 2007 is disposed at a rear end side of the outer case 2002, and a light source unit 1100 and an optical unit 1000 are disposed at positions adjacent to the power supply unit 2007 in the front side of the device. In addition, within the outer case 2002, a base end side of a projection lens unit 2006 is located at the center and at the front side of the optical unit 1000. An interface substrate 2011 including an input-output interface circuit mounted thereon is disposed at one side of the optical unit 1000 so as to be oriented in a front-rear direction of the device. A video substrate 2012 including a video-signal processing circuit mounted thereon is disposed in parallel to the interface substrate 2011. A control substrate 2013 including a control unit 2010 configured to control the entire device is disposed at an upper side of the light source unit 1100 and the optical unit 1000. Speakers 2014R and 2014L are disposed at respective left and right corners at the front end side of the device.

A cooling device 2100 including a suction fan 2015A, 2015B used to cool the inside of the device is disposed above and below the optical unit 1000. An air extraction fan 2016 is disposed at a side surface of the device, which is the rear surface side of the light source unit 1100. An auxiliary cooling fan 2017 used to pull, into the power supply unit 2007, a cooling air flow from the suction fan 2015A is disposed at a position that faces ends of the interface substrate 2011 and the video substrate 2012. Of these fans, the suction fan 2015B functions mainly as a fan for cooling a liquid crystal panel that will be described later. In addition to an air-cooling type, the cooling device 2100 may employ water cool or a method using a Peltier device.

2. Configuration of Optical Unit

Figure 3:
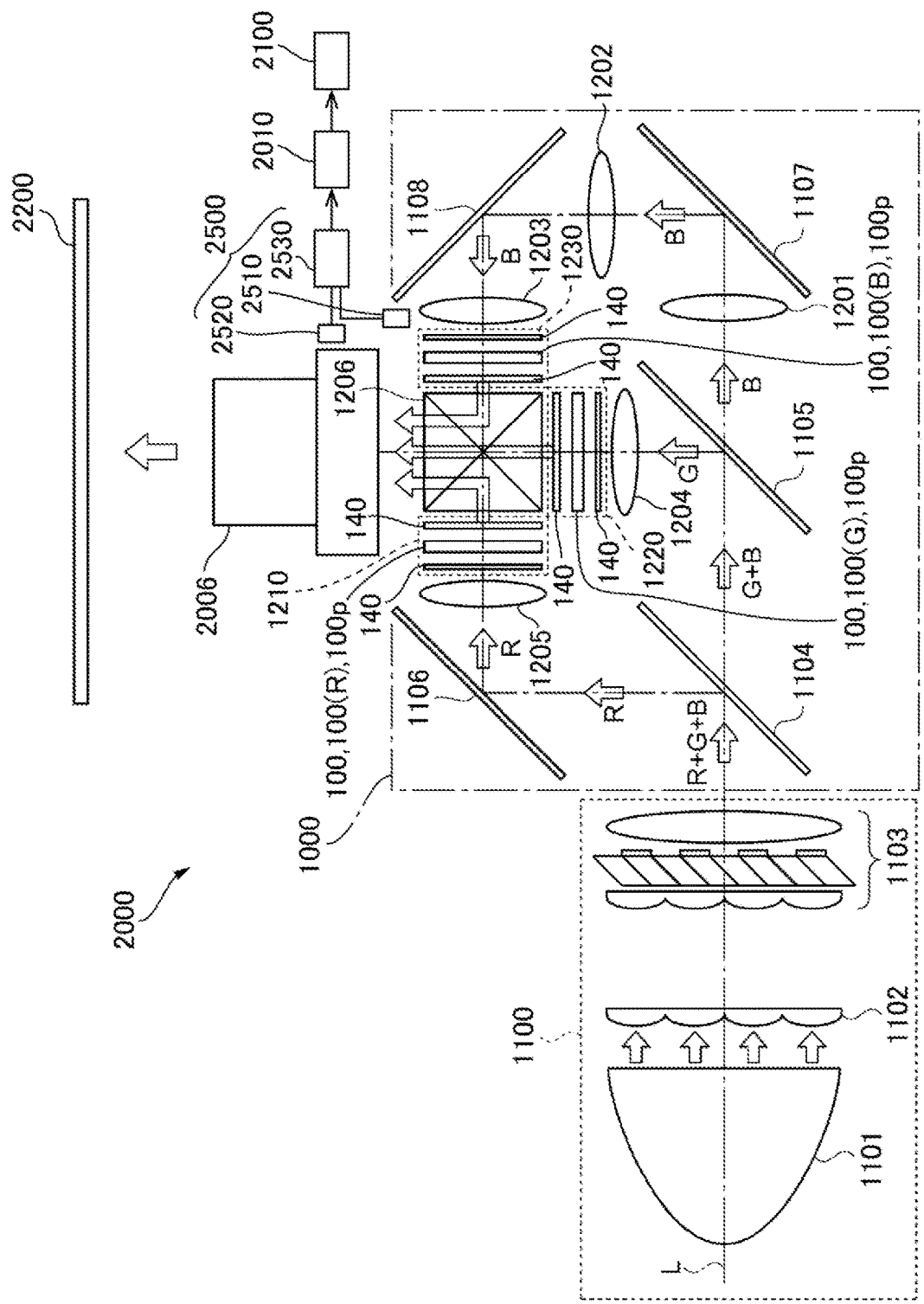
FIG. 3 is an explanatory diagram illustrating a configuration of an optical unit or the like illustrated in FIG. 1.

FIG. 3 is an explanatory diagram illustrating a configuration of the optical unit 1000 or the like illustrated in FIG. 1. As illustrated in FIG. 3, the projection-type display device 2000 includes the light source unit 1100 disposed along a system optical axis L, two dichroic mirrors 1104 and 1105 each serving as a light separation element, three reflection mirrors 1106, 1107, and 1108, and five relay lenses 1201, 1202, 1203, 1204, and 1205. In addition, the projection-type display device 2000 includes three transparent liquid crystal light valves 1210, 1220, and 1230 serving as a way to modulate light, a dichroic prism 1206 serving as a light combining element, and the projection lens unit 2006. The light source unit 1100 has a schematic configuration including: a lamp unit 1101 serving as a light source comprised of a white light source such as an extra high-pressure mercury lamp or a halogen lamp; an integrator lens 1102; and a polarized-light conversion element 1103.

The dichroic mirror 1104 reflects red light (R) of polarized light beam emitted from the light source unit 1100, and transmits the green light (G) and the blue light (B). The other dichroic mirror 1105 reflects the green light (G) that the dichroic mirror 1104 transmits, and transmits the blue light (B). The red light (R) reflected by the dichroic mirror 1104 is reflected by the reflection mirror 1106, and then passes through the relay lens 1205 to enter the liquid crystal light valve 1210. The green light (G) reflected by the dichroic mirror 1105 passes through the relay lens 1204, and enters the liquid crystal light valve 1220. The blue light (B) transmitted by the dichroic mirror 1105 passes through a light guiding system including the three relay lenses 1201, 1202, and 1203 and the two reflection mirrors 1107 and 1108, and enters the liquid crystal light valve 1230.

The liquid crystal light valves 1210, 1220, and 1230 are each disposed so as to face an incident surface for each color light of the cross dichroic prism 1206. The color light that enters the liquid crystal light valves 1210, 1220, and 1230 is modulated on the basis of an image signal (image signal), and is outputted toward the dichroic prism 1206. The dichroic prism 1206 is formed by affixing four right-angle prisms, and at the inner surfaces of the affixed prisms, a dielectric multilayer film that reflects the red light and a dielectric multilayer film that reflects the blue light are formed in a cross shape. These dielectric multilayer films combine three pieces of color light to combine light representing a color image. The combined light is projected onto a screen 2200 by the projection lens unit 2006 serving as a projection optical system to display an image in an enlarged manner.

The liquid crystal light valve 1220 includes a liquid crystal device 100 that will be described later. The liquid crystal device 100 includes a liquid crystal panel 100p and a pair of polarizing elements 140 disposed in a crossed-Nicols state at an input side and an output side of color light of the liquid crystal panel 100p. The other liquid crystal light valves 1210 and 1230 are configured in a manner similar to the liquid crystal light valve 1220. In the following description, at the time of describing the liquid crystal device 100 using the three liquid crystal light valves 1210, 1220, and 1230, in a case where the description does not relate to corresponding color light, each of these liquid crystal devices is referred to as a "liquid crystal device 100". On the other hand, in a case where the liquid crystal device 100 needs to be recognized differently in terms of corresponding color light, the liquid crystal device 100 corresponding to red light R is referred to as a "liquid crystal device 100(R) for red", the liquid crystal device 100 corresponding to green light G is referred to as a "liquid crystal device 100(G) for green", and the liquid crystal device 100 corresponding to blue light B is referred to as a "liquid crystal device 100(B) for blue". In addition, the liquid crystal panel 100p of either one of the liquid crystal device 100(R) for red and the liquid crystal device 100(G) for green is referred to as a "first liquid crystal panel", and the liquid crystal panel 100p of the other one is referred to as a "third liquid crystal panel". Furthermore, the liquid crystal panel 100p of the liquid crystal device 100(B) for blue where light having a wavelength shorter than the first liquid crystal panel enters is referred to as a "second liquid crystal panel". As an example, the present embodiment gives a case in which the liquid crystal panel 100p of the liquid crystal device 100(G) for green is referred to as the "first liquid crystal panel", and the liquid crystal panel 100p of the liquid crystal device 100(R) for red is referred to as the "third liquid crystal panel".

3. Entire Configuration of Liquid Crystal Device 100

Figure 4:
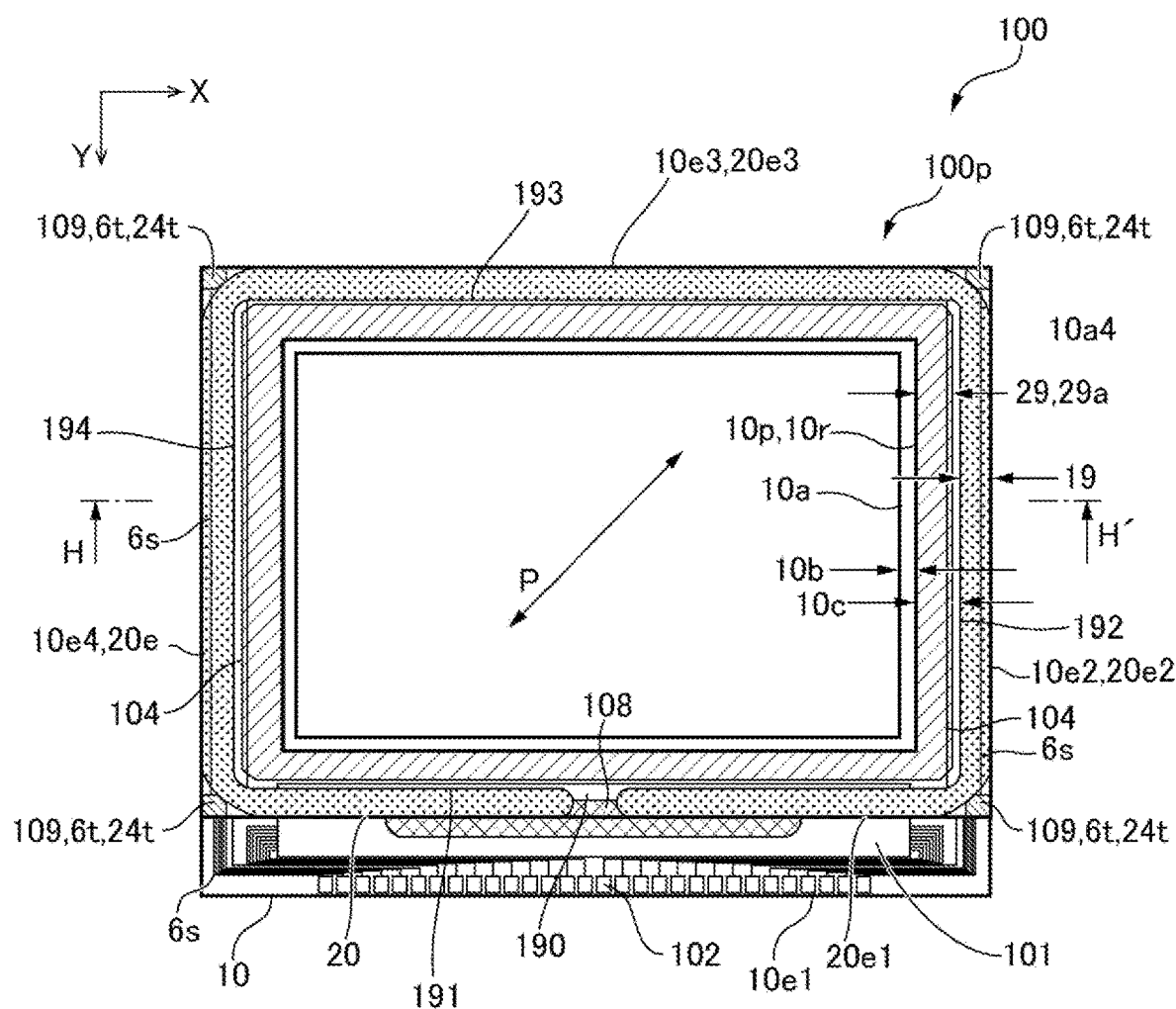
FIG. 4 is a plan view illustrating an example of a configuration of a liquid crystal device illustrated in FIG. 3.
Figure 5:
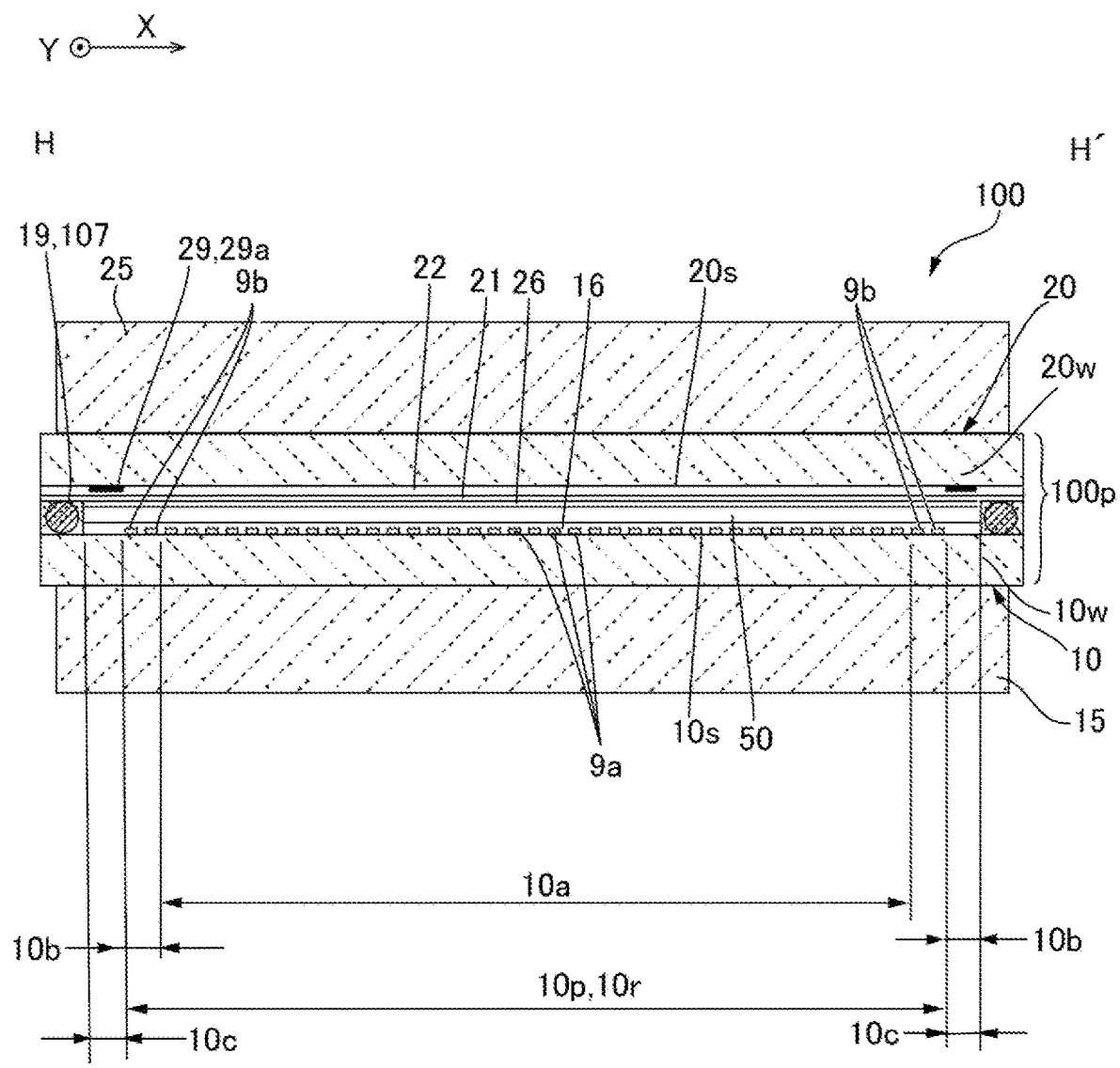
FIG. 5 is a cross-sectional view taken along the H-H' of the liquid crystal device illustrated in FIG. 4.

FIG. 4 is a plan view illustrating an example of a configuration of the liquid crystal device 100 illustrated in FIG. 3. FIG. 5 is a cross-sectional view taken along the H-H' of the liquid crystal device 100 illustrated in FIG. 4. In the following description, at the time of describing a layer formed at a first substrate 10, an upper layer side or front surface side means a side (side where a second substrate 20 and a liquid crystal layer 50 are located) opposite to a side where a substrate body 10w of the first substrate 10 is located, and a lower layer side means a side where the substrate body 10w of the first substrate 10 is located. At the time of describing a layer formed at the second substrate 20, an upper layer side or front surface side means a side (side where the first substrate 10 and the liquid crystal layer 50 are located) opposite to a side at which a substrate body 20w of the second substrate 20 is located, and a lower layer side means a side where the substrate body 20w of the second substrate 20 is located. In addition, description will be made by setting directions perpendicular to each other in an in-plane direction of the liquid crystal device to be a first direction X and a second direction Y.

As illustrated in FIGS. 4 and 5, the liquid crystal device 100 includes the liquid crystal panel 100p. In the liquid crystal device 100, a pair of substrates, which are comprised of the first substrate 10 and the second substrate 20, are affixed with a seal material 19 with a predetermined space being provided therebetween. The seal material 19 is provided in a frame shape along the outer edge of the second substrate 20. The seal material 19 includes an adhesive made of photo-curable resin or thermosetting resin, and contains a gap material 107 such as glass fiber or glass beads used to obtain a predetermined value of distance between both substrates. In the liquid crystal device 100, the liquid crystal layer 50 is provided in a region surrounded by the seal material 19 and between the first substrate 10 and the second substrate 20. In the seal material 19, a cut-out portion used as a liquid-crystal inject port 190 is formed. After a liquid crystal material is injected, the liquid-crystal inject port 190 is closed with a sealing material 108. Note that, in a case where the liquid crystal material is installed using a dropping method, the liquid-crystal inject port 190 is not formed.

In the liquid crystal device 100, the first substrate 10 and the second substrate 20 each have a quadrilateral shape. At the inner side of the seal material 19, a pixel area 10r in which a plurality of pixels are arranged is provided as a quadrilateral region. The seal material 19 is provided in a quadrilateral frame shape so as to surround the periphery of the pixel area 10r. A peripheral area 10c having a quadrilateral frame shape is provided between the pixel area 10r and the seal material 19.

The pixel area 10r is provided so as to have a rectangular region having a longer side extending in the first direction X. In addition, as with the pixel area 10r, the first substrate 10 and the second substrate 20 each have a rectangular shape having longer sides 10e1, 10e3, 20e1, and 20e3 extending in the first direction X and having shorter sides 10e2, 10e4, 20e2, and 20e4 extending in the second direction Y. Corresponding to such a shape, the seal material 19 has longer sides 191 and 193 extending in the first direction X, and has shorter sides 192 and 194 extending in the second direction Y.

The first substrate 10 includes a data-line drive circuit 101 and a plurality of terminals 102 formed at a side of the first substrate 10 that sticks out from the second substrate 20 and extending along the longer side 10e1 serving as one side of the first substrate 10. In addition, a scanning line drive circuit 104 is formed along the shorter sides 10e2 and 10e4 each adjacent to this one side. The terminals 102 are provided at an outer peripheral side than the seal material 19. A flexible wiring substrate (not illustrated) is coupled to the terminals 102. Various potentials or various types of signals are inputted into the first substrate 10 through the flexible wiring substrate. The data-line drive circuit 101 and the scanning line drive circuit 104 partially overlap with the seal material 19 in plan view.

The first substrate 10 includes a light-transmitting substrate body 10w made out, for example, of a quartz substrate or a glass substrate. A portion extending from the substrate body 10w to a first alignment film 16 corresponds to the first substrate 10. At a one-side surface 10s side of the substrate body 10w that is opposed to the second substrate 20, a plurality of switching elements and pixel electrodes 9a electrically coupled to the plurality of switching elements respectively are formed in a matrix manner at each of pixels in the pixel area 10r. The first alignment film 16 is formed at an upper layer side of the pixel electrode 9a.

The second substrate 20 includes a light-transmitting substrate body 20w made out, for example, of a quartz substrate and a glass substrate. A portion extending from the substrate body 20w to a second alignment film 26 corresponds to the second substrate 20. At a one-side surface 20s side of the substrate body 20w that is opposed to the first substrate 10, a common electrode 21 is formed. The common electrode 21 is formed across the entire surface of the second substrate 20. At the one-side surface 20s of the second substrate 20, a light shielding member 29 is formed at a lower layer side of the common electrode 21. The second alignment film 26 is stacked at a front surface of the common electrode 21 that is located at the liquid crystal layer 50 side. A light-transmitting insulation film 22 is formed between the light shielding member 29 and the common electrode 21. The light shielding member 29 is formed as a frame portion 29a extending along the outer peripheral edge of the pixel area 10r. The inner edge of the frame portion 29a defines a region of the liquid crystal panel 100p where illumination light enters. Note that the second substrate 20 may include a light shielding layer located at the same layer as the light shielding member 29 and provided as a black matrix portion that overlaps with an inter-pixel region interposed between adjacent pixel electrodes 9a. In addition, in the second substrate 20, a lens may be formed at a region that overlaps with each of the plurality of pixel electrodes 9a in plan view.

In the liquid crystal device 100, at an outer side than the seal material 19, an inter-substrate conduction electrode portion 24t made out of a portion of the common electrode 21 is formed at four corner portions of the second substrate 20 that are located at the one-side surface 20s side. At the one-side surface 10s side of the first substrate 10, inter-substrate conduction electrode portions 6t are formed at positions that are opposed to the inter-substrate conduction electrode portions 24t of the second substrate 20. The inter-substrate conduction electrode portions 6t are each electrically conductive to a constant-potential wiring line 6s to which a common potential Vcom is applied. The constant-potential wiring line 6s is electrically conductive to a terminal 102 for constant potential from among the plurality of terminals 102. An inter-substrate conduction material 109 containing electrically conductive particles is disposed between the inter-substrate conduction electrode portion 6t and the inter-substrate conduction electrode portion 24t. The common electrode 21 of the second substrate 20 is electrically coupled to the first substrate 10 side through the inter-substrate conduction electrode portion 6t, the inter-substrate conduction material 109, and the inter-substrate conduction electrode portion 24t. Thus, the common potential Vcom is applied from the first substrate 10 side to the common electrode 21.

The liquid crystal device 100 according to the present embodiment is a transparent-type liquid crystal device. Thus, the pixel electrode 9a and the common electrode 21 are made out of an electrically conducting transmissive film such as an indium tin oxide (ITO) film or an indium zinc oxide (IZO) film. In the transparent-type liquid crystal device 100, for example, light entering from the second substrate 20 side is outputted from the first substrate 10. During this period of time, the light is modulated, and an image is displayed. Note that, in a case where the common electrode 21 is made out of an electrically conducting transmissive film and the pixel electrode 9a is made out of a reflection electrode, the liquid crystal device 100 is configured as a reflection-type liquid crystal device. In the reflection-type liquid crystal device 100, light entering from the second substrate 20 side is reflected by the pixel electrode 9a of the first substrate 10, and is outputted from the second substrate 20 side. During this period of time, the light is modulated, and an image is displayed.

In the liquid crystal device 100, a first dustproof glass 15 is stacked and is disposed at a surface of the first substrate 10 that is opposite from the second substrate 20, and a second dustproof glass 25 is stacked and is disposed at a surface of the second substrate 20 that is opposite from the first substrate 10. Thus, in a case where foreign substances such as dust are attached on the liquid crystal device 100, foreign substances such as dust are less likely to be attached at positions close to the liquid crystal layer 50 such as a surface of the first substrate 10 that is opposite from the second substrate 20 or a surface of the second substrate 20 that is opposite from the first substrate 10. This makes it possible to avoid a case in which illumination light is focused on foreign substances such as dusts attached on the liquid crystal device 100, and these foreign substances are seen in an image.

In the present embodiment, the light shielding member 29 provided at the second substrate 20 defines a region of the liquid crystal panel 100p where illumination light enters. However, it may be possible to employ a configuration in which the second dustproof glass 25 includes a light shielding member, and the light shielding member of the second dustproof glass 25 defines a region of the liquid crystal panel 100p where illumination light enters.

4. Electrical Configuration of Liquid Crystal Device 100

Figure 6:
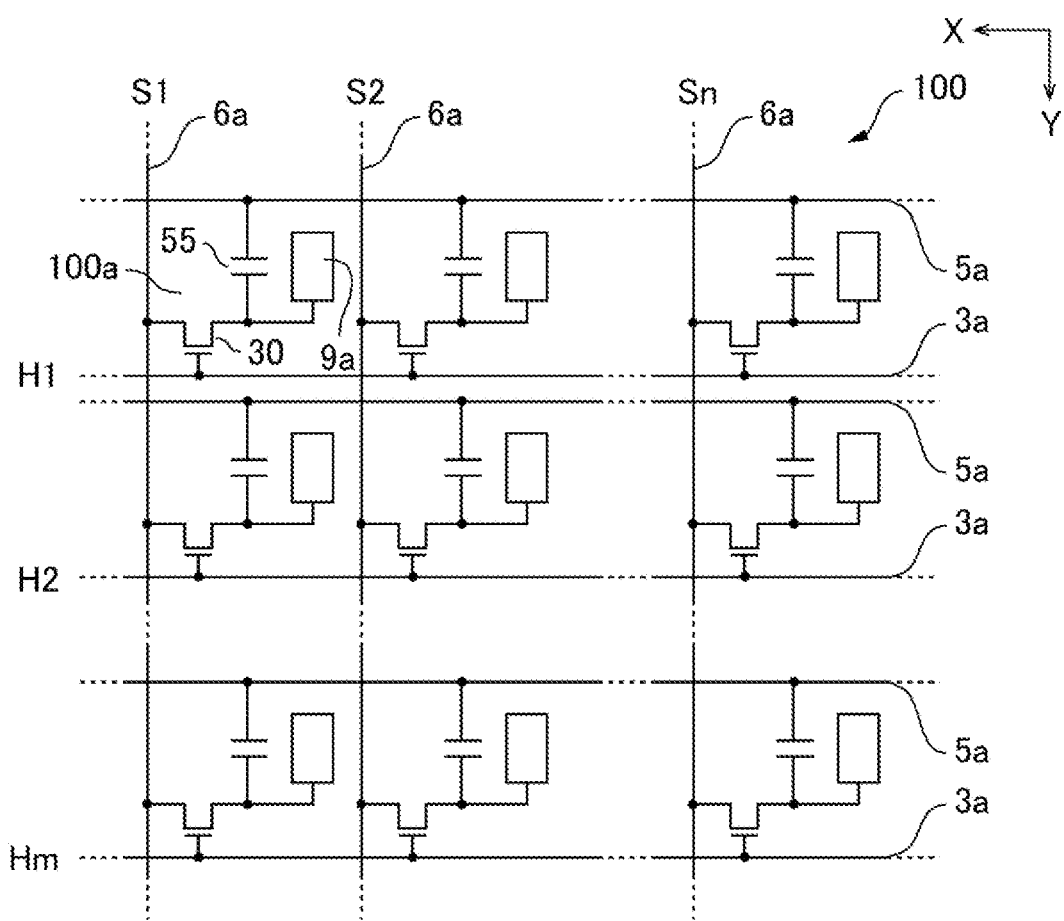
FIG. 6 is an explanatory diagram illustrating an electrical configuration of the liquid crystal device illustrated in FIG. 4.

FIG. 6 is an explanatory diagram illustrating an electrical configuration of the liquid crystal device 100 illustrated in FIG. 4. As illustrated in FIG. 6, in a display region 10p of the liquid crystal device 100, a pixel electrode 9a and a transistor 30 corresponding to this pixel electrode 9a are formed on each of the plurality of pixels 100a formed in a matrix manner. In addition, a data line 6a used to supply image signals S1, S2, . . . , Sn is electrically coupled to a source of the transistor 30. The image signals S1, S2, . . . , Sn to be written in the data line 6a may be supplied in this order in a line sequential manner, or may be supplied on a group-by-group basis, the group being comprised of a plurality of data lines 6a adjacent to each other. A scanning line 3a is electrically coupled to a gate of the transistor 30. Scanning signals H1, H2, . . . , Hm are line-sequentially applied in this order to the scanning line 3a in a pulse manner at predetermined timing. The pixel electrode 9a is electrically coupled to a drain of the transistor 30. The transistor 30 is brought into an ON state for a certain period of time to write the image signals S1, S2, . . . , Sn supplied from the data line 6a into each of the pixels 100a at predetermined timing. The image signals S1, S2, . . . , Sn written in the pixel 100a through the pixel electrode 9a as described above are retained for a certain period of time between the pixel 100a and the common electrode 21 of the second substrate 20 described with reference to FIG. 4. In the liquid crystal layer 50, the alignment or order of molecular group changes depending on the voltage level applied to modulate light, which makes it possible to achieve gray-scale display. Thus, light having contrast according to the image signals S1, S2, . . . , Sn is outputted from the liquid crystal device 100.

Here, in some cases, in order to prevent the image signals S1, S2, . . . , Sn retained in each of the pixels 100a from leaking, a retention capacitor 55 may be added in parallel with liquid crystal capacitor formed between the pixel electrode 9a and the common electrode 21 by using a capacitance line 5a. In this case, the voltage of the pixel electrode 9a is retained by the retention capacitor 55 for a period of time longer than the period time for which the source voltage is applied. This makes it possible to improve a charge retention property, thereby being able to achieve the liquid crystal device 100 of an active matrix type with a high contrast ratio.

5. Specific Configuration of Pixel 100a

Figure 7:
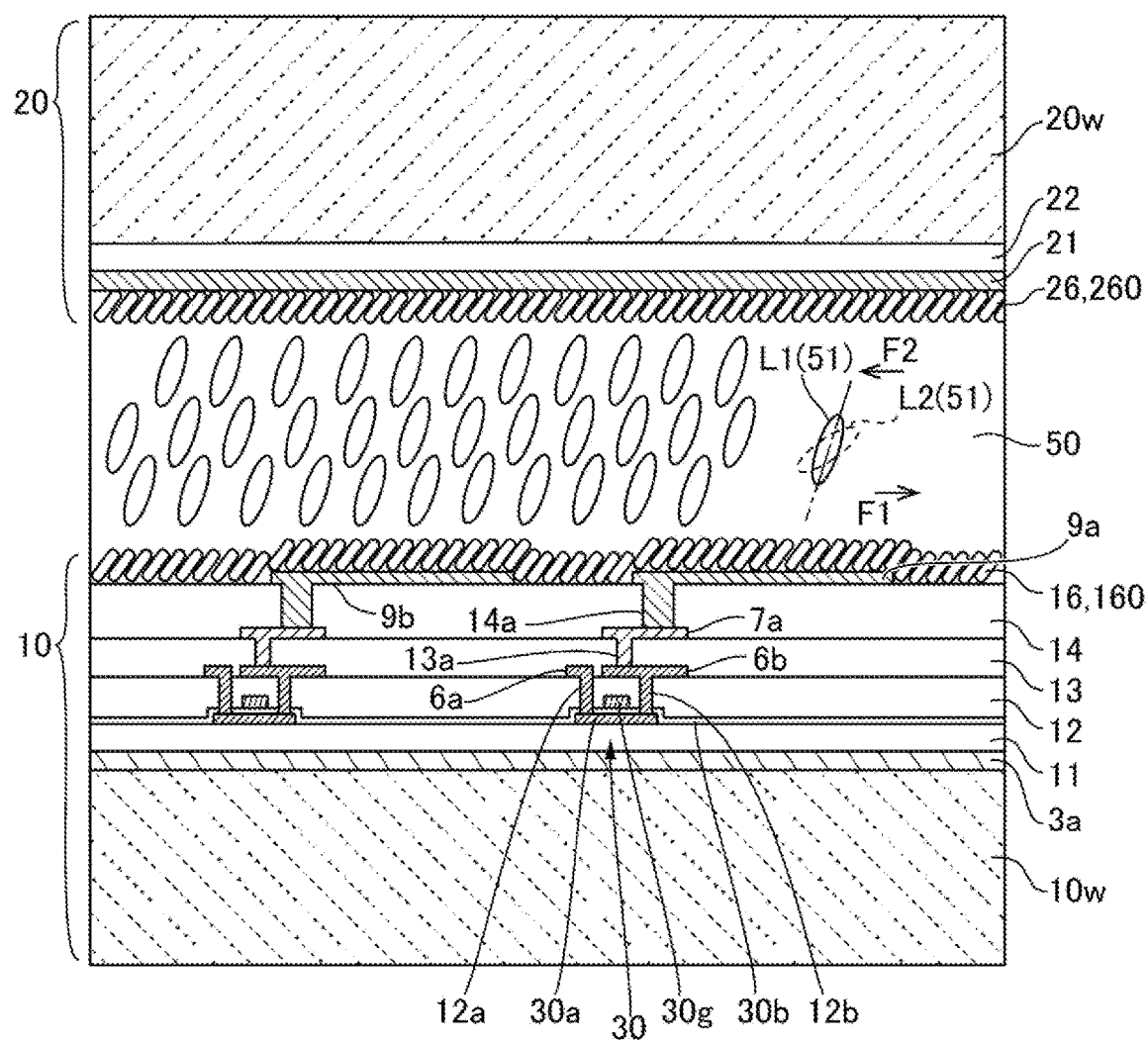
FIG. 7 is a cross-sectional view schematically illustrating a specific example of a configuration of pixels or the like of the liquid crystal device illustrated in FIG. 4.

FIG. 7 is a cross-sectional view schematically illustrating a specific example of a configuration of a pixel or the like of the liquid crystal device 100 illustrated in FIG. 4. As illustrated in FIG. 7, a scanning line 3a at a lower layer side made of an electrically conducting film such as an electrically conductive polysilicon film, a metal silicide film, a metal film, or a metallic compound film is formed at the one-side surface 10s side of the first substrate 10. In the present embodiment, the scanning line 3a includes a light shielding film made of tungsten silicide (WSi) or the like. A light-transmitting insulation film 11 is formed at an upper layer side of the scanning line 3a. The transistor 30 including a semiconductor layer 30a is formed at a front surface side of the insulating film 11. In a case of the present embodiment, the insulating film 11 is made, for example, of a silicon oxide film.

The transistor 30 includes the semiconductor layer 30a and a gate electrode 30g that intersects the semiconductor layer 30a. A transmissive gate insulating film 30b is provided between the semiconductor layer 30a and the gate electrode 30g. The semiconductor layer 30a is comprised, for example, of a polysilicon film (polycrystalline silicon film). The gate insulating film 30b has a two-layer structure including a gate insulating film comprised of a silicon oxide film obtained by thermal oxidation of the semiconductor layer 30a and a second gate insulating film comprised of a silicon oxide film formed through low-pressure CVD or the like. The gate electrode 30g is electrically coupled to the scanning line 3a through a contact hole (not illustrated) penetrating the gate insulating film 30b and the insulating film 11.

Transmissive interlayer dielectrics 12, 13, and 14 comprised, for example, of a silicon oxide film are sequentially formed at an upper layer side of the gate electrode 30g. Retention capacitors (not illustrated) are formed by making the most of gaps or the like between the interlayer dielectrics 12, 13, and 14. A data line 6a and a drain electrode 6b are formed between the interlayer dielectric 12 and the interlayer dielectric 13. A relay electrode 7a is formed between the interlayer dielectric 13 and the interlayer dielectric 14. The data line 6a is electrically coupled to a source area of the semiconductor layer 30a through a contact hole 12a that penetrates the interlayer dielectric 12 and the gate insulating film 30b. The drain electrode 6b is electrically coupled to a drain region of the semiconductor layer 30a through a contact hole 12b that penetrates the interlayer dielectric 12 and the gate insulating film 30b. The relay electrode 7a is electrically coupled to the drain electrode 6b through a contact hole 13a that penetrates the interlayer dielectric 13. The interlayer dielectric 14 has a flat front surface. The pixel electrode 9a is formed at the front surface of the interlayer dielectric 14. The pixel electrode 9a is conductive to the relay electrode 7a through a contact hole 14a that penetrates the interlayer dielectric 14. Thus, the pixel electrode 9a is electrically coupled to a drain region of the transistor 30 through the relay electrode 7a and the drain electrode 6b.

The first alignment film 16 and the second alignment film 26 are inorganic alignment films each comprised of a diagonally vapor-deposited film including a silicon oxide film ($SiO_x$ ($x \geq 2$)), a titanium oxide film ($TiO_2$), a magnesium oxide film (MgO), and an aluminum oxide film ($Al_2O_3$ or the like). Thus, in the first alignment film 16 and the second alignment film 26, pillar-shaped structures 160 and 260 are tilted diagonally relative to a direction of a normal line to the one-side surfaces 10s and 20s of the first substrate 10 and the second substrate 20. Alignment regulation force of the first alignment film 16 and the second alignment film 26 is antiparallel. Thus, the first alignment film 16 and the second alignment film 26 are configured such that, as indicated by the solid line L1, the longitudinal axes of nematic liquid crystal molecules (liquid crystal molecules 51) having negative dielectric anisotropy and used in the liquid crystal layer 50 are aligned diagonally relative to the first substrate 10 and the second substrate 20 to apply pre-tilt to the liquid crystal molecules 51. Thus, when the liquid crystal device 100 is driven, the liquid crystal molecules 51 in the liquid crystal layer 50 change the postures of the liquid crystal molecules 51 as indicated by the solid line L1 and the dotted line L2 in FIG. 7.

In the present embodiment, the first alignment film 16 or the second alignment film 26 is configured such that, as indicated, for example, by the arrow P in FIG. 4, the liquid crystal molecules 51 are aligned in a direction angled at 45 degrees or 135 degrees relative to the four sides that define the outer edge of the pixel area 10r. Thus, the liquid crystal molecules 51 are aligned in a diagonal direction formed by two corners forming a diagonal line from among four corners of the pixel area 10r. As described above, the liquid crystal device 100 is configured as a liquid crystal device having a VA mode of normally black. In the present embodiment, the first alignment film 16 and the second alignment film 26 are each comprised of a silicon oxide film.

6. Configuration of Display Region 100a

In the liquid crystal device 100, a region of the liquid crystal panel 100p where illumination light enters serves as the display region 10p where illumination light is modulated and is outputted, and also is a region defined by the inner edge of the light shielding member 29 (frame portion 29a). In the present embodiment, the entire pixel area 10r forms the display region 10p.

Here, of pixel electrodes 9a arranged in the pixel area 10r, pixel electrodes 9a arranged along the outer edge of the pixel area 10r are used as dummy pixel electrodes 9b. The present embodiment applies, to the dummy pixel electrodes 9b, alternating potential with which black display is performed, regardless of images to be displayed. Thus, the entire region of the dummy pixel area 10b in which the dummy pixel electrodes 9b are arranged serves as an electronic partition portion that performs black display, and configures parting in conjunction with the light shielding member 29. On the other hand, a given image corresponding to an image signal is generated in the region 10a surrounded by the dummy pixel area 10b.

Note that the light shielding member 29 may be provided so as to overlap with the dummy pixel electrodes 9b. In this case, the region 10a surrounded by the dummy pixel area 10b serves as the display region 10p where illumination light enters. In addition, the dummy pixel area 10b may not be provided. In this case, the entire pixel area 10r serves as the display region 10p, and a given image corresponding to an image signal is generated.

7. Impurities in Liquid Crystal Layer 50

Figure 8:
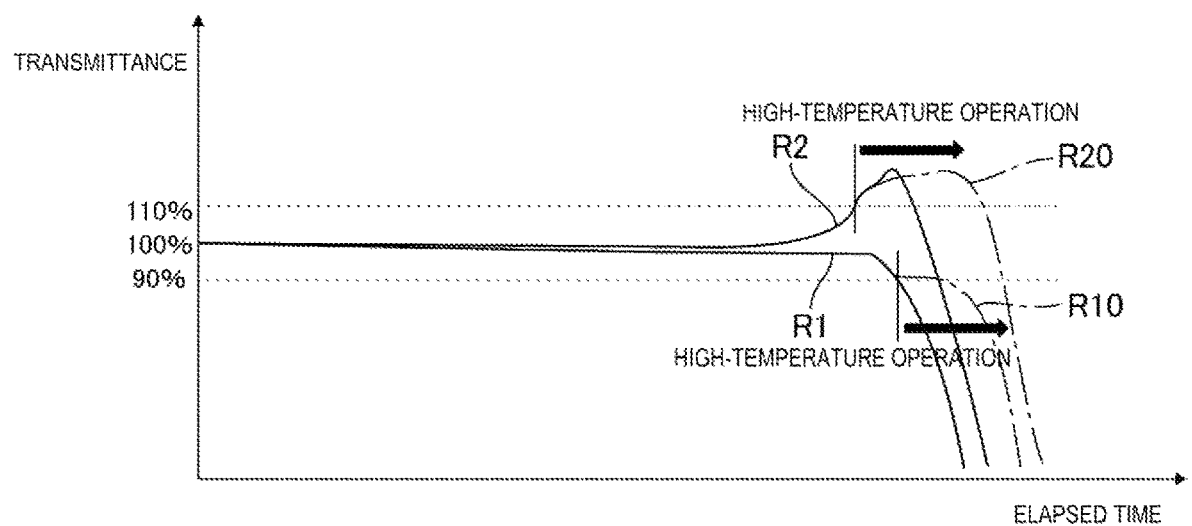
FIG. 8 is an explanatory diagram illustrating a temporal change of the transmittance of a liquid crystal panel illustrated in FIG. 4.

FIG. 8 is an explanatory diagram illustrating a temporal change of the transmittance of the liquid crystal panel 100p illustrated in FIG. 4. In the liquid crystal device 100 illustrated in FIGS. 4 and 5, when illumination light is emitted onto the liquid crystal layer 50 of the display region 10p, decomposition reaction or the like takes place in liquid crystal to cause impurities to be generated in the liquid crystal layer. When these impurities are unevenly distributed in the display region 10p, modulation performance deteriorates in the region where the impurities are unevenly distributed. For example, when ionic impurities are unevenly distributed, insulation resistance of the liquid crystal layer 50 reduces to reduce a drive potential. This causes display irregularity or ghosting phenomenon due to energization. In particular, when the first alignment film 16 and the second alignment film 26 are comprised of a silicon oxide film, dangling bond (dangling bond) of Si atom or dimer structure (Si—Si bond) where Si atoms are bonded together exists. Such dangling bond of Si atom is prone to be terminated with a silanol group (—Si—OH) having high reactivity due to reaction with moisture within an atmosphere or moisture in the liquid crystal layer 50, and also is prone to react with a liquid crystal material of the liquid crystal layer 50.

Here, impurities generated in the display region 10p diffuse from the display region 10p to the outside of the display region 10p due to a difference in concentration or a temperature difference from the outside of the display region 10p. In addition, when the liquid crystal layer 50 is driven, as indicated by the arrows F1 and F2 in FIG. 7, a flow of the liquid crystal molecules 51 is generated due to vibration of the liquid crystal molecules 51. This causes impurities to be swept from the display region 10p to the outside of the display region 10p along the flow of the liquid crystal molecules 51.

However, impurities have a property in which they tend to be adsorbed by the first alignment film 16 and the second alignment film 26. This adsorption impedes sweeping of the impurities from the display region 10p to the outside of the display region 10p. Here, the force of adsorption of impurities changes depending on temperatures of the liquid crystal layer 50. Specifically, the force of adsorption of impurities gets weaker as temperatures of the liquid crystal layer 50 rise. Thus, the present embodiment raises temperatures of the liquid crystal layer 50 to weaken the force of adsorption of impurities, thereby enhancing the phenomenon in which impurities diffuse due to a difference in concentration or difference in temperatures, or are swept from the display region 10p to the outside of the display region 10p due to flow of the liquid crystal molecules 51. In addition, the transmittance of the liquid crystal panel 100p is monitored. After the transmittance of the liquid crystal panel 100p changes by 10%, temperatures of the liquid crystal layer 50 are raised.

More specifically, as illustrated in FIG. 3, the projection-type display device 2000 includes a transmittance measuring device 2500 including: a first optical sensor 2510 that detects light leaking from the relay lens 1203; a second optical sensor 2520 that detects light leaking from the projection lens unit 2006; and a calculation unit 2530 that calculates a ratio between the detected value by the first optical sensor 2510 and the detected value by the second optical sensor 2520. The detected value by the first optical sensor 2510 is proportional to light entering the liquid crystal device 100, whereas the detected value by the second optical sensor 2520 is proportional to light outputted from the liquid crystal device 100. Thus, as the change in the transmittance of the liquid crystal panel 100p, the transmittance measuring device 2500 monitors a change in the ratio between the detected value by the first optical sensor 2510 and the detected value by the second optical sensor 2520 at the time of displaying an image having a predetermined gray-scale with the liquid crystal panel 100p. Here, the transmittance is set to be a transmittance (T10) obtained at the time of applying a driving voltage (V10) that causes a transmitted light intensity that is equal to 10% of the transmitted light intensity obtained at the time of the maximum transmittance immediately after the start of use of the liquid crystal panel 100p. Note that the transmittance is measured by performing solid display at the driving voltage (V10) that causes a transmitted light intensity that is equal to 10% of the transmitted light intensity at the time of the maximum transmittance immediately after the start of use of the liquid crystal panel 100p when no display is made such as during ON sequence, for example.

Furthermore, when a result of measurement of the transmittance by the transmittance measuring device 2500 changes by 10% relative to a default value, the control unit 2010 illustrated in FIG. 2 controls the cooling device 2100 to raise a temperature of the liquid crystal layer 50. More specifically, after the result of measurement of the transmittance by the transmittance measuring device 2500 changes by 10% relative to the default value, the cooling device 2100 weakens cooling to the liquid crystal panel 100p under the control by the control unit 2010 to raise a temperature of the liquid crystal layer 50. For example, the cooling device 2100 controls a temperature of the liquid crystal layer 50 to be not less than 60° C. and not more than a nematic-isotropic phase transition temperature Tni-20° C.

In the liquid crystal device 100(B) for blue where blue light (B), which has the shortest wavelength among the red light (R), the green light (G), and the blue light (B), enters, impurities are more likely to be generated due to a photochemical reaction as compared with the liquid crystal device 100(R) for red and the liquid crystal device 100(G) for green. Thus, the present embodiment monitors the transmittance of the liquid crystal panel 100p of the liquid crystal device 100(B) for blue. However, the cooling device 2100 is common to the liquid crystal device 100(B) for blue, the liquid crystal device 100(R) for red, and the liquid crystal device 100(G) for green. Thus, for all of the liquid crystal device 100(B) for blue, the liquid crystal device 100(R) for red, and the liquid crystal device 100(G) for green, temperatures of the liquid crystal layer 50 are controlled to be not less than 60° C. and not more than nematic-isotropic phase transition temperature Tni-20° C.

Note that, in order to monitor temperatures of the liquid crystal layer 50, it may be possible to employ a configuration that includes a temperature sensor that detects temperatures of the liquid crystal panel 100p of the liquid crystal device 100(B) for blue. In addition, it may be possible to study, in advance, a relationship between cooling performance of the cooling device 2100 and temperatures of the liquid crystal panel 100p, and control the temperatures of the liquid crystal panel 100p without using any temperature sensor.

Here, as for the transmittance of the liquid crystal panel 100p, there are a case where the transmittance rapidly decreases due to uneven distribution of impurities after a period of time when the transmittance does not substantially change with elapse of time as indicated by the solid line R1 in FIG. 8, and a case where the transmittance temporarily increases and then rapidly decreases due to uneven distribution of impurities after a period of time when the transmittance does not substantially change with elapse of time as indicated by the solid line R2 in FIG. 8. In any of the cases, the present embodiment performs a high-temperature operation of raising a temperature of the liquid crystal layer 50 after the result of measurement of transmittance by the transmittance measuring device 2500 changes by 10% relative to a default value. With the high-temperature operation, it is possible to retard the rapid decrease in the transmittance of the liquid crystal panel 100p as indicated by the long dashed short dashed lines R10 and R20 in FIG. 8.

Thus, as the liquid crystal device 100 operates, the concentration of impurities in the display region 10p increases. After the transmittance changes by 10% relative to the default value, temperatures of the liquid crystal layer 50 are raised to weaken adsorption of impurities. This makes it possible to efficiently sweep the impurities from the display region 10p to the outside of the display region 10p due to diffusion resulting from a concentration difference or temperature difference or due to flow of liquid crystal molecules 51 of impurities resulting from flow of the liquid crystal molecules 51.

Furthermore, in the present embodiment, since a high-temperature operation of raising the temperatures of the liquid crystal layer 50 is performed after the result of measurement of the transmittance changes by 10% relative to the default value, the liquid crystal layer 50 is not heated more than necessary. This makes it possible to suppress deterioration of the liquid crystal layer 50 due to heat. In addition, temperatures of the liquid crystal layer 50 are raised to be not less than 60° C. This makes it possible to sufficiently weaken the force of adsorption of impurities, which makes it possible to efficiently sweep impurities from the display region 10p to the outside of the display region 10p due to diffusion resulting from a concentration difference or temperature difference or due to flow of the liquid crystal molecules 51. Furthermore, when temperatures of the liquid crystal layer 50 are raised, the upper limit is set to the nematic-isotropic phase transition temperature Tni-20° C. This makes it possible to eliminate the influence on display of an image, and also to suppress deterioration of the liquid crystal layer 50 due to heat.

Second Embodiment

Figure 9:
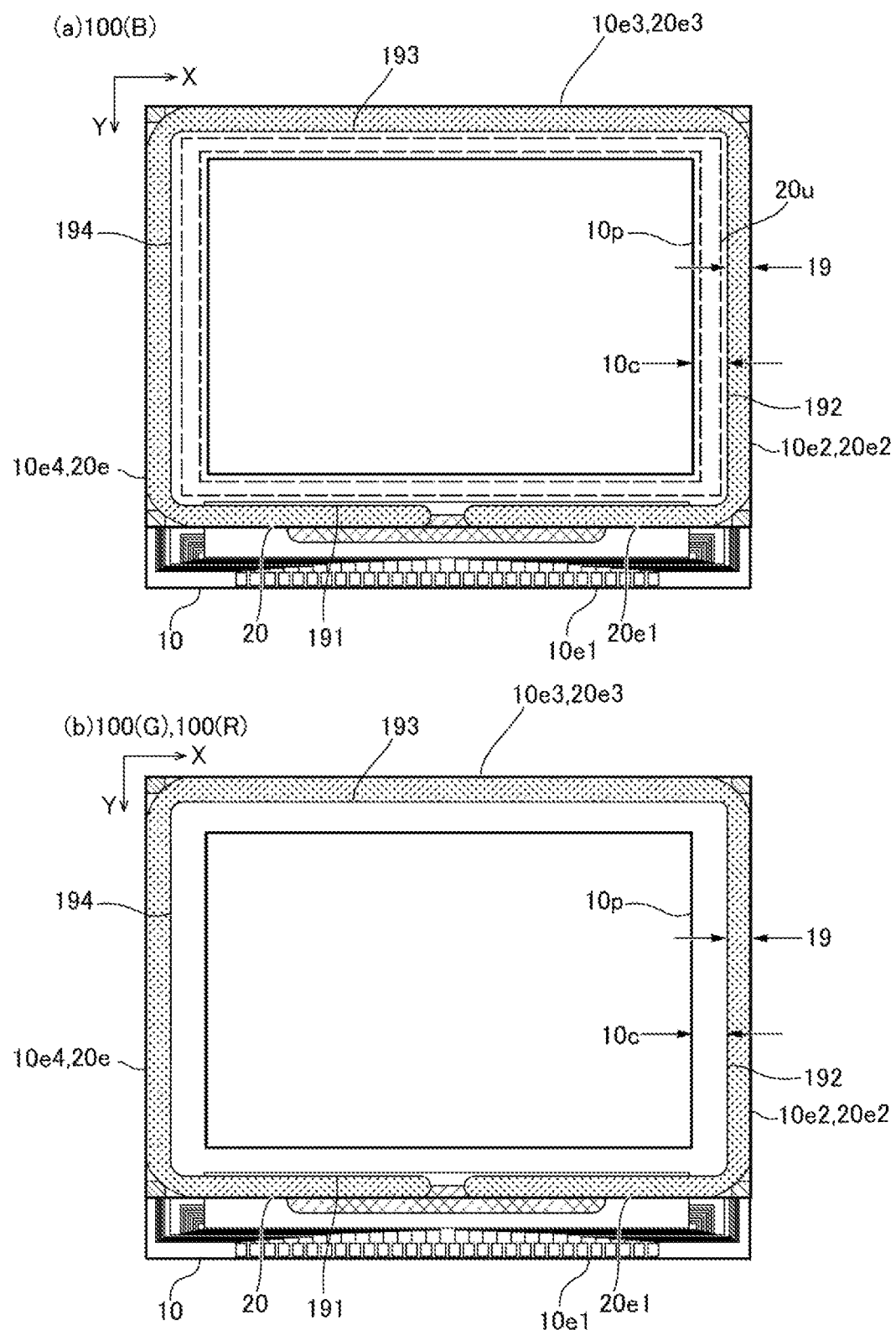
FIG. 9 is an explanatory diagram illustrating a projection-type display device according to a second embodiment of the present disclosure.
Figure 10:
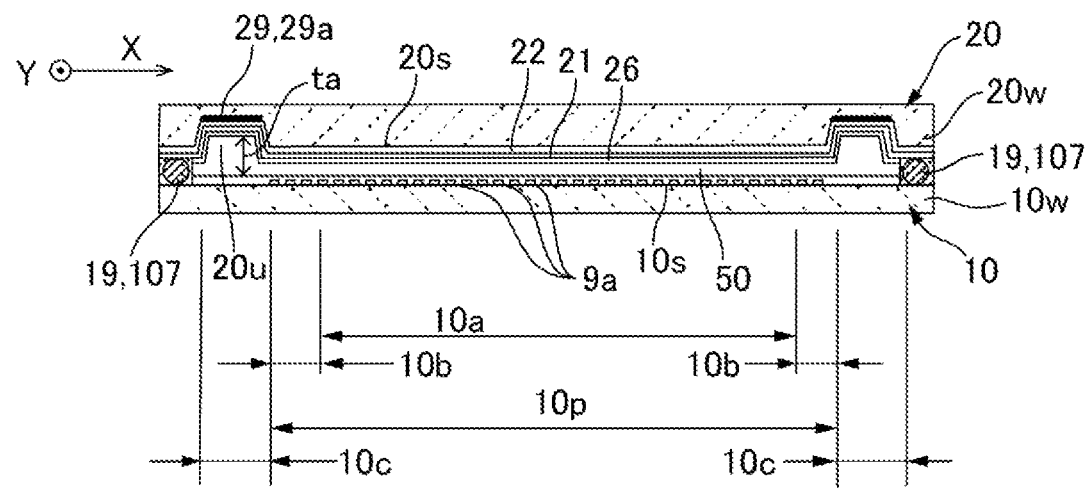
FIG. 10 is an explanatory diagram illustrating structures in cross section of three liquid crystal devices illustrated in FIG. 9.
Figure 10:
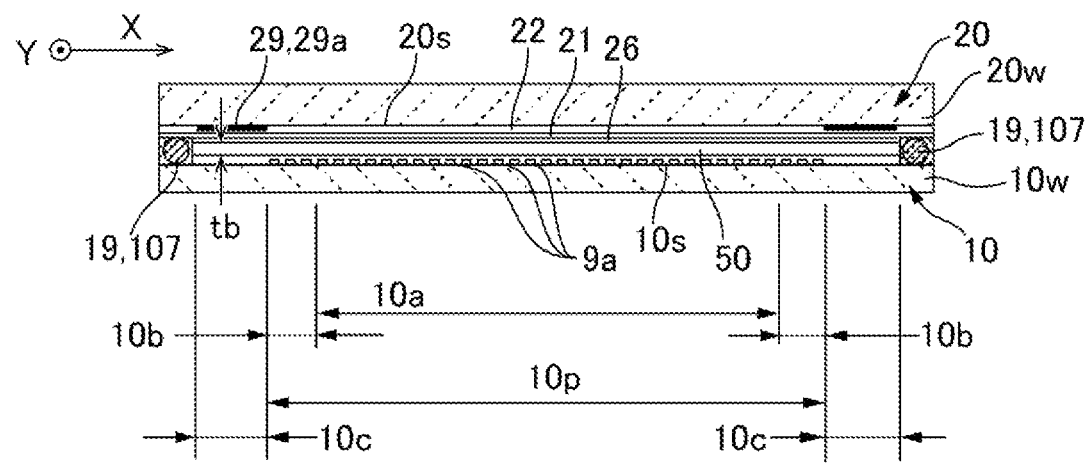
Figure 11:
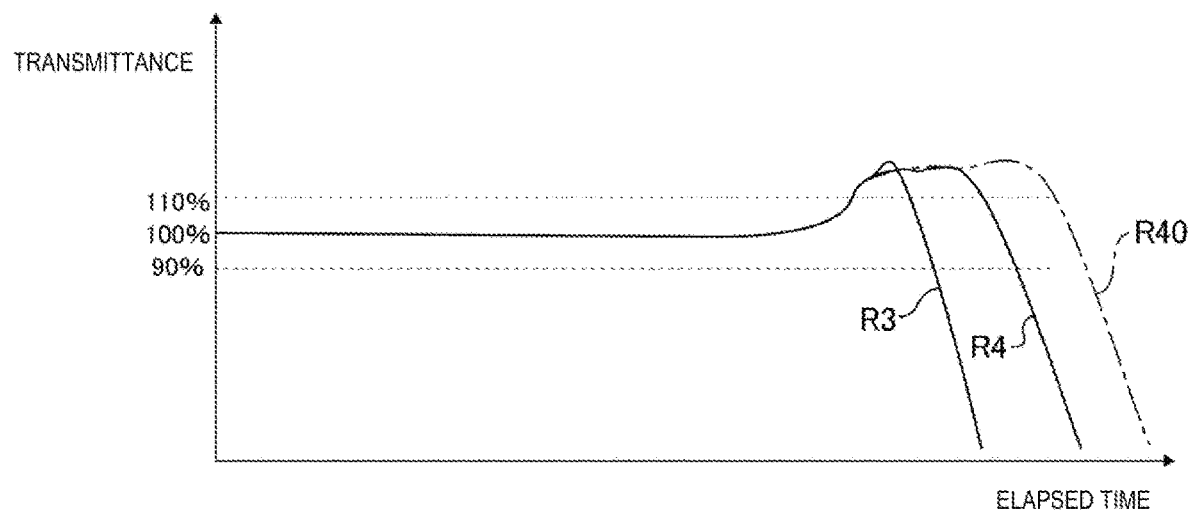
FIG. 11 is an explanatory diagram illustrating an effect of the second embodiment.

FIG. 9 is an explanatory diagram illustrating a projection-type display device 2000 according to a second embodiment of the present disclosure. FIG. 9 illustrates a planar structure of three liquid crystal devices 100 used in the projection-type display device 2000. FIG. 10 is an explanatory diagram illustrating structures in cross section of three liquid crystal devices 100 illustrated in FIG. 9. FIG. 11 is an explanatory diagram illustrating an effect of the second embodiment. In FIGS. 9 and 10, the upper portion (a) illustrates the liquid crystal device 100(B) for blue, and the lower portion (b) illustrates the liquid crystal device 100(R) for red and the liquid crystal device 100(G) for green. Note that the basic configurations of the present embodiment and the following embodiments are similar to that in the first embodiment. Thus, the same reference characters are attached to the same portions, and explanation thereof will not be repeated. In the liquid crystal device 100(B) for blue where blue light (B), which has the shortest wavelength among the red light (R), the green light (G), and the blue light (B), enters, impurities are more likely to be generated due to a photochemical reaction as compared with the liquid crystal device 100(R) for red and the liquid crystal device 100(G) for green. Thus, the three liquid crystal devices 100 are configured differently.

Specifically, a liquid crystal volume ratio V1/V2 of each of three liquid crystal devices 100 is set to be an appropriate value, where V1 is a volume of the liquid crystal layer 50 at the inner side of the seal material 19 of the liquid crystal device 100, and V2 is a volume of liquid crystal in the display region 10p. More specifically, as illustrated in FIGS. 9 and 10, in the present embodiment, the liquid crystal volume ratio V1/V2 of the "second liquid crystal panel" serving as the liquid crystal panel 100p of the liquid crystal device 100(B) for blue is greater than the liquid crystal volume ratio V1/V2 of the liquid crystal panel 100p of the liquid crystal device 100(G) for green, as compared with the "first liquid crystal panel" serving as the liquid crystal panel 100p of the liquid crystal device 100(G) for green. Note that the liquid crystal volume ratio V1/V2 of the "third liquid crystal panel" serving as the liquid crystal panel 100p of the liquid crystal device 100(R) for red is equal to the liquid crystal volume ratio V1/V2 of the liquid crystal device 100(G) for green.

In order to achieve such a configuration, the present embodiment is configured such that the liquid crystal device 100(B) for blue has the same planar structure as the liquid crystal device 100(G) for green and the liquid crystal device 100(R) for red, and the outer dimensions, the size of the display region 10p, a space between the display region 10p and the seal material 19, or the like are equal. In addition, the thickness of the liquid crystal layer 50 in the display region 10p of the liquid crystal device 100(B) for blue is equal to that of the liquid crystal device 100(G) for green and the liquid crystal device 100(R) for red.

However, the thickness to of the liquid crystal layer 50 between the display region 10p and the seal material 19 of the liquid crystal device 100(B) for blue is thicker than the thickness tb of the liquid crystal layer 50 between the display region 10p and the seal material 19 of the liquid crystal device 100(G) for green and the liquid crystal device 100(R) for red. More specifically, in the liquid crystal device 100(B) for blue, a recessed portion 20u is formed between the display region 10p and the seal material 19 in the substrate body 20w of the second substrate 20. However, in the liquid crystal device 100(G) for green and the liquid crystal device 100(R) for red, no recessed portion is formed between the display region 10p and the seal material 19. In the present embodiment, the recessed portion 20u extends so as to surround the display region 10p.

Thus, the thickness to of the liquid crystal layer 50 between the display region 10p and the seal material 19 of the liquid crystal device 100(B) for blue is thicker than the thickness tb of the liquid crystal layer 50 between the display region 10p and the seal material 19 of the liquid crystal device 100(G) for green and the liquid crystal device 100(R) for red. With this configuration, the volume V2 of liquid crystal in the display region 10p is equal between the liquid crystal device 100(B) for blue, the liquid crystal device 100(G) for green, and the liquid crystal device 100(R) for red, whereas the volume V1 of liquid crystal at the inner side of the seal material 19 of the liquid crystal device 100(B) for blue is greater than the volume V1 of liquid crystal at the inner side of the seal material 19 of the liquid crystal device 100(G) for green and the liquid crystal device 100(R) for red. Thus, the liquid crystal volume ratio V1/V2 of the liquid crystal device 100(B) for blue is greater than the liquid crystal volume ratio V1/V2 of the liquid crystal device 100(G)) for green and the liquid crystal volume ratio V1/V2 of the liquid crystal device 100(R) for red.

For this reason, in the liquid crystal device 100(B) for blue, the degree of dilution of impurities in the liquid crystal layer 50 is great. Thus, as illustrated in FIG. 11, it is possible to retard the rapid decrease in the transmittance of the liquid crystal panel 100p from the property indicated by the solid line R3 to the property indicated by the solid line R4, by employing the configuration of raising temperatures of the liquid crystal layer 50 on the basis of a mode that does not employ either the configuration of raising temperatures of the liquid crystal layer 50 described in the first embodiment or the configuration of increasing the liquid crystal volume ratio V1/V2 described in the present embodiment. In addition, by employing both the configuration of raising temperatures of the liquid crystal layer 50 described in the first embodiment and the configuration of increasing the liquid crystal volume ratio V1/V2 described in the present embodiment, it is possible to further retard the rapid decrease in the transmittance of the liquid crystal panel 100p from the property indicated by the solid line L4 to the property indicated by the solid line R40. Thus, even when more impurities are generated in the liquid crystal device 100(B) for blue as compared with the liquid crystal device 100(R) for red and the liquid crystal device 100(G) for green, it is possible to suppress the influence of impurities on display in the display region 10p to a level equivalent to the liquid crystal device 100(R) for red and the liquid crystal device 100(G) for green. This makes it possible for the projection-type display device 2000 to display high-quality image for a long period of time.

Modification Example of Second Embodiment

The second embodiment employs a structure in which the recessed portion 20u extends so as to surround the display region 10p. However, it may be possible to employ a mode in which the recessed portion 20u extends only along the longer sides 191 and 193 of the seal material 19, or a mode in which the recessed portion 20u extends only along the short sides 192 and 194 of the seal material 19. In addition, when the recessed portion 20u extends so as to surround the display region 10p, it may be possible to employ a mode in which the recessed portion 20u discontinues between the longer side 191, 193 and the shorter side 192, 194. This mode makes it easy to make the common electrode 21 continuously extend from the display region 10p to the conducting position using the inter-substrate conduction material 109.

Furthermore, in the second embodiment, only the liquid crystal device 100(B) for blue includes the recessed portion 20u. However, the liquid crystal device 100(B) for blue, the liquid crystal device 100(G) for green, and the liquid crystal device 100(R) for red may each include the recessed portion 20u. In this case, the liquid crystal device 100(B) for blue includes the recessed portion 20u having a larger volume than that of the liquid crystal device 100(R) for red and the liquid crystal device 100(G) for green.

Third Embodiment

Figure 12:
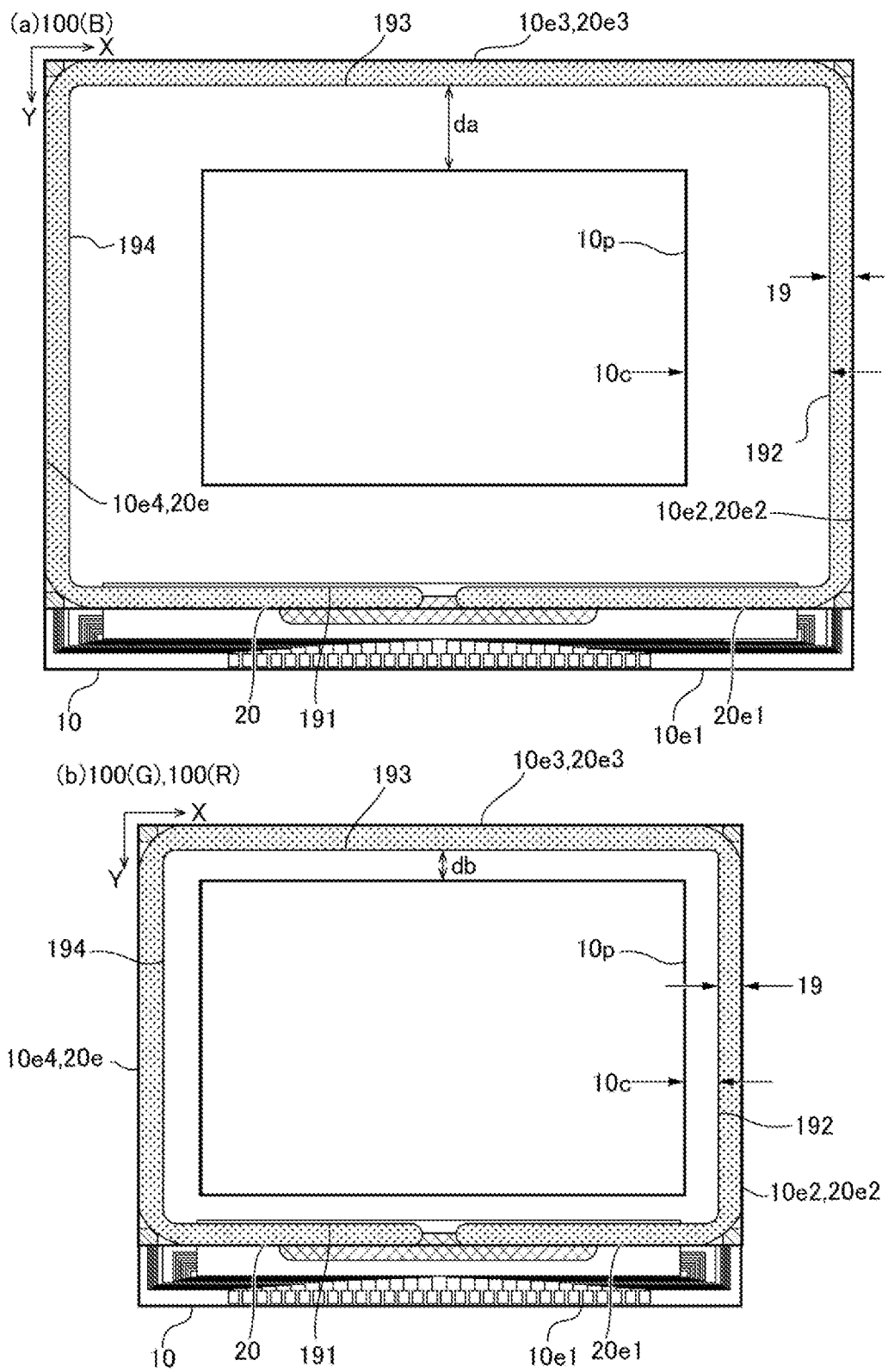
FIG. 12 is an explanatory diagram illustrating a projection-type display device according to a third embodiment of the present disclosure.

FIG. 12 is an explanatory diagram illustrating a projection-type display device 2000 according to a third embodiment of the present disclosure. FIG. 12 illustrates a planar structure of three liquid crystal devices 100 used in the projection-type display device 2000. In FIG. 12, the upper portion (a) illustrates a liquid crystal device 100(B) for blue, and the lower portion (b) illustrates a liquid crystal device 100(R) for red and a liquid crystal device 100(G) for green. As in the second embodiment, in the present embodiment, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. More specifically, as illustrated in FIG. 12, a space da between the display region 10p and the seal material 19 of the liquid crystal device 100(B) for blue is wider than a space db between the display region 10p and the seal material 19 of the liquid crystal device 100(G) for green and a space db between the display region 10p and the seal material 19 of the liquid crystal device 100(R) for red. Thus, while the three liquid crystal devices 100 have the same volume V2 of liquid crystal in the display region 10p, the volume V1 of liquid crystal at the inner side of the seal material 19 of the liquid crystal device 100(B) for blue is greater than the volume V1 of liquid crystal at the inner side of the seal material 19 of the liquid crystal device 100(G) for green and the liquid crystal device 100(R) for red.

In the present embodiment, in order to achieve such a configuration, the outer dimension of the liquid crystal device 100(B) for blue is greater than the outer dimension of the liquid crystal device 100(G) for green and the outer dimension of the liquid crystal device 100(R) for red. However, the size of the display region 10p or the thickness of the liquid crystal layer 50 in the display region 10p of the liquid crystal device 100(B) for blue is equal to those of the liquid crystal device 100(G) for green and the liquid crystal device 100(R) for red.

As described above, as in the second embodiment, in each of the liquid crystal devices 100 in the projection-type display device 2000 according to the present embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10p to a level equivalent to the liquid crystal device 100(R) for red and the liquid crystal device 100(G) for green, achieving an effect similar to the second embodiment.

Fourth Embodiment

Figure 13:
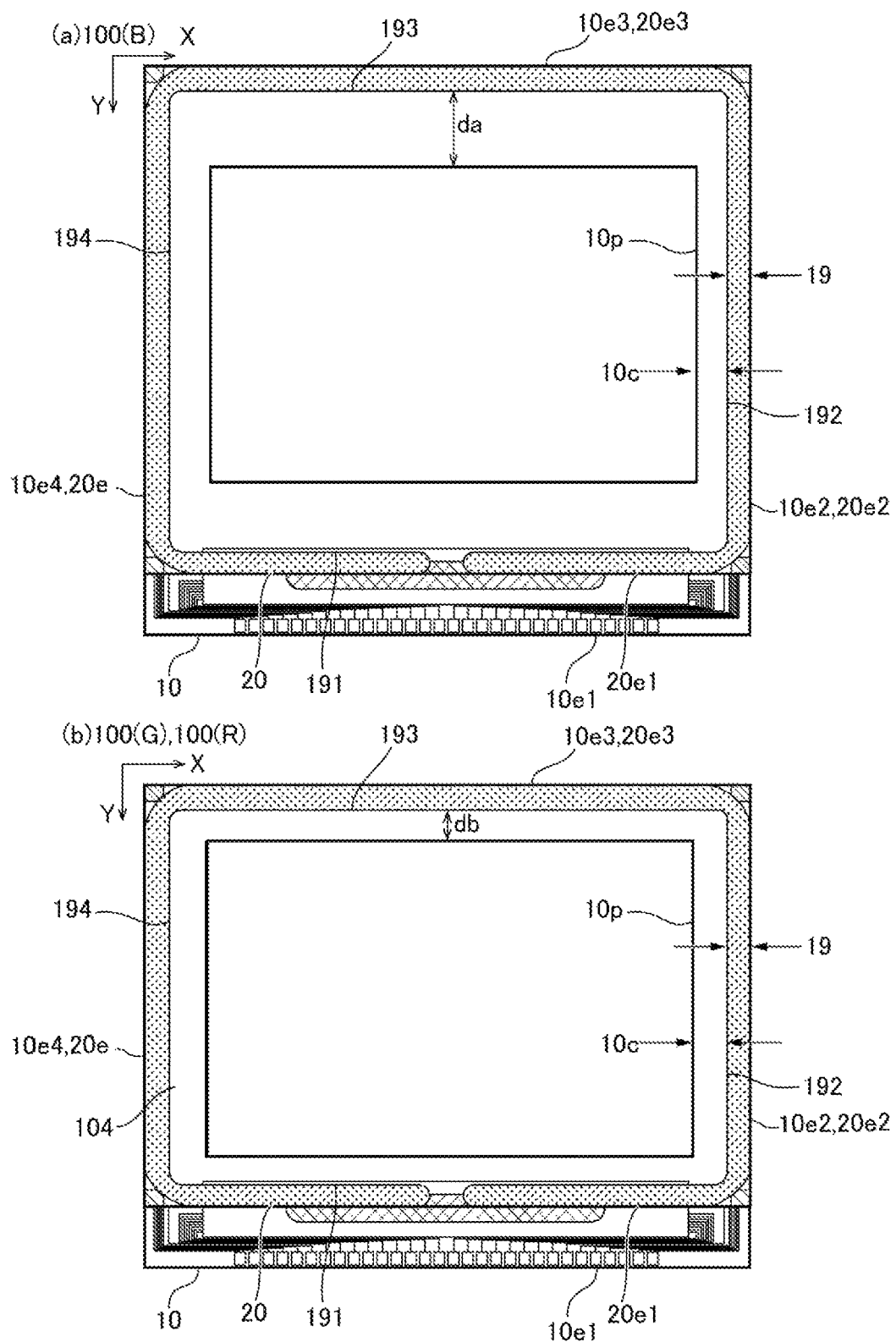
FIG. 13 is an explanatory diagram illustrating a projection-type display device according to a fourth embodiment of the present disclosure.

FIG. 13 is an explanatory diagram illustrating a projection-type display device 2000 according to a fourth embodiment of the present disclosure. FIG. 13 illustrates a planar structure of three liquid crystal devices 100 used in the projection-type display device 2000. In FIG. 13, the upper portion (a) illustrates a liquid crystal device 100(B) for blue and the lower portion (b) illustrates a liquid crystal device 100(R) for red and a liquid crystal device 100(G) for green. As in the second embodiment, in the present embodiment, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. More specifically, as illustrated in FIG. 13, a space da between the display region 10p and the seal material 19 of the liquid crystal device 100(B) for blue in a direction in which the shorter sides 192 and 194 extend is wider than a space db between the display region 10p and the seal material 19 of the liquid crystal device 100(G) for green and the liquid crystal device 100(R) for red. However, in the three liquid crystal devices 100, the space between the display region 10p and the seal material 19 in the first direction X (direction in which the longer sides 191 and 193 extend) is equal to each other.

More specifically, in the three liquid crystal devices 100, the size of the display region 10p and the outer dimension in the direction in which the longer sides 191 and 193 extend are equal to each other. However, the outer dimension of the liquid crystal device 100(B) for blue in the second direction Y is greater than the outer dimension of the liquid crystal device 100(G) for green in the second direction Y that is the direction in which the shorter sides 192 and 194 extend. With this configuration, the volume V2 of liquid crystal in the display region 10p is equal between the liquid crystal device 100(B) for blue, the liquid crystal device 100(G) for green, and the liquid crystal device 100(R) for red, whereas the volume V1 of liquid crystal at the inner side of the seal material 19 of the liquid crystal device 100(B) for blue is greater than the volume V1 of liquid crystal at the inner side of the seal material 19 of the liquid crystal device 100(G) for green and the liquid crystal device 100(R) for red.

As described above, as in the second embodiment, in each of the liquid crystal devices 100 in the projection-type display device 2000 according to the present embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10p to a level equivalent to the liquid crystal device 100(R) for red and the liquid crystal device 100(G) for green, achieving an effect similar to the second embodiment.

In addition, the outer dimension of the liquid crystal device 100(B) for blue in the second direction Y is greater than the outer dimension of the liquid crystal device 100(G) for green in the second direction Y that is the direction in which the shorter sides 192 and 194 extend, whereas the outer dimensions of the three liquid crystal devices 100 in the first direction X are equal to each other. With this configuration, in the vicinity of the dichroic prism 1206 illustrated in FIG. 3, the liquid crystal device 100 does not have a spatial margin in the first direction X, whereas the liquid crystal device 100 has a spatial margin in the second direction Y. Thus, when the outer dimension of the liquid crystal device 100(B) for blue in the second direction Y is increased, it is possible to appropriately place the three liquid crystal devices 100 in the vicinity of the dichroic prism 1206.

Fifth Embodiment

Figure 14:
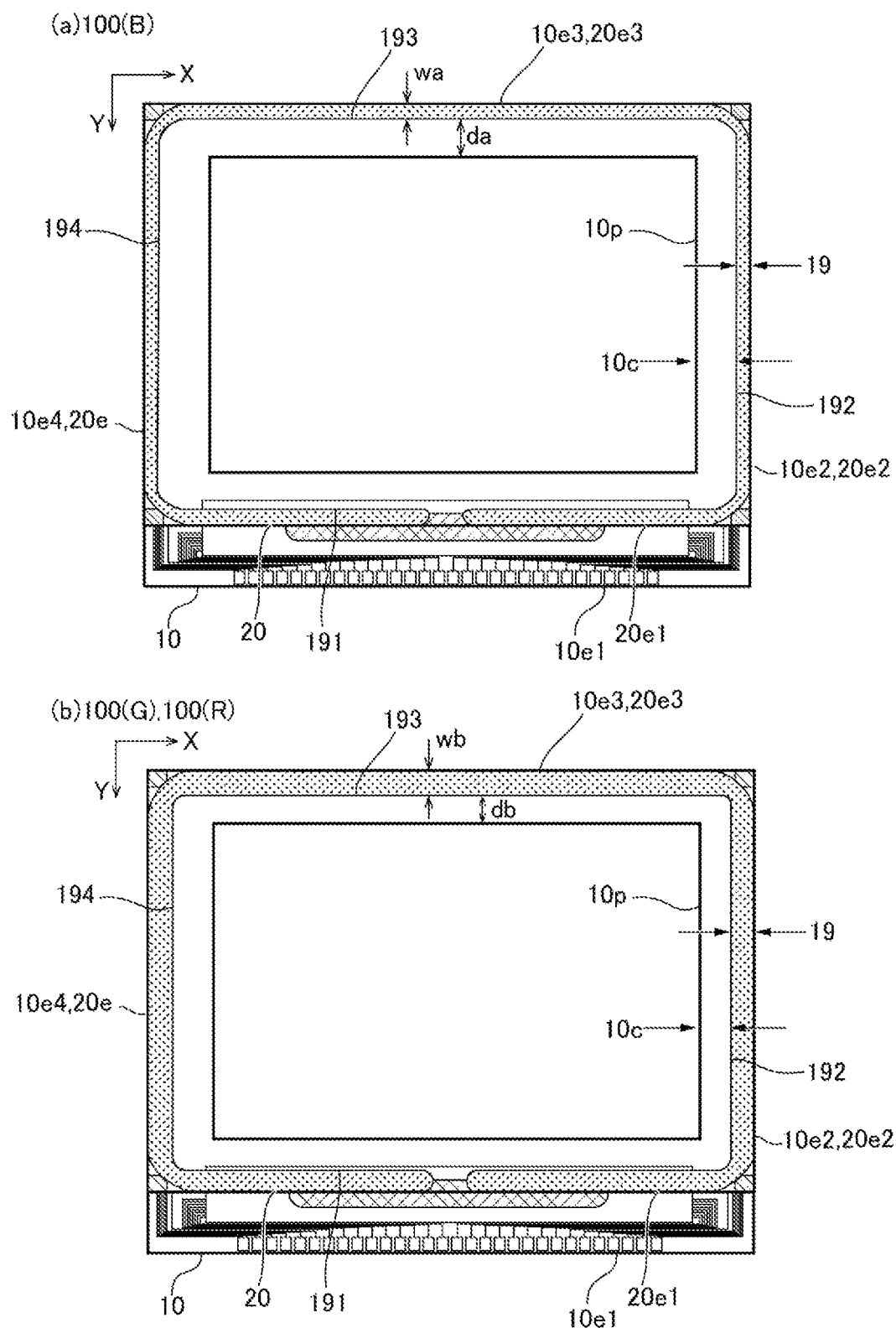
FIG. 14 is an explanatory diagram illustrating a projection-type display device according to a fifth embodiment of the present disclosure.

FIG. 14 is an explanatory diagram illustrating a projection-type display device 2000 according to a fifth embodiment of the present disclosure. FIG. 14 illustrates a planar structure of three liquid crystal devices 100 used in the projection-type display device 2000. In FIG. 14, the upper portion (a) illustrates a liquid crystal device 100(B) for blue, and the lower portion (b) illustrates a liquid crystal device 100(R) for red and a liquid crystal device 100(G) for green. As in the second embodiment, in the present embodiment, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. More specifically, as illustrated in FIG. 14, a width wa of the seal material 19 of the liquid crystal device 100(B) for blue is narrower than a width wb of the seal material 19 of the liquid crystal device 100(G) for green and a width wb of the seal material 19 of the liquid crystal device 100(R) for red. However, in the three liquid crystal devices 100, the size of the display region 10p and the outer dimension are equal to each other. Thus, the space da between the display region 10p and the seal material 19 of the liquid crystal device 100(B) for blue is wider than the space db between the display region 10p and the seal material 19 of the liquid crystal device 100(G) for green and the space db between the display region 10p and the seal material 19 of the liquid crystal device 100(R) for red. With this configuration, the volume V2 of liquid crystal in the display region 10p is equal between the liquid crystal device 100(B) for blue, the liquid crystal device 100(G) for green, and the liquid crystal device 100(R) for red, whereas the volume V1 of liquid crystal at the inner side of the seal material 19 of the liquid crystal device 100(B) for blue is greater than the volume V1 of liquid crystal at the inner side of the seal material 19 of the liquid crystal device 100(G) for green and the liquid crystal device 100(R) for red.

As described above, as in the second embodiment 2, in each of the liquid crystal devices 100 in the projection-type display device 2000 according to the present embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10p to a level equivalent to the liquid crystal device 100(R) for red and the liquid crystal device 100(G) for green, achieving an effect similar to the second embodiment.

Sixth Embodiment

Figure 15:
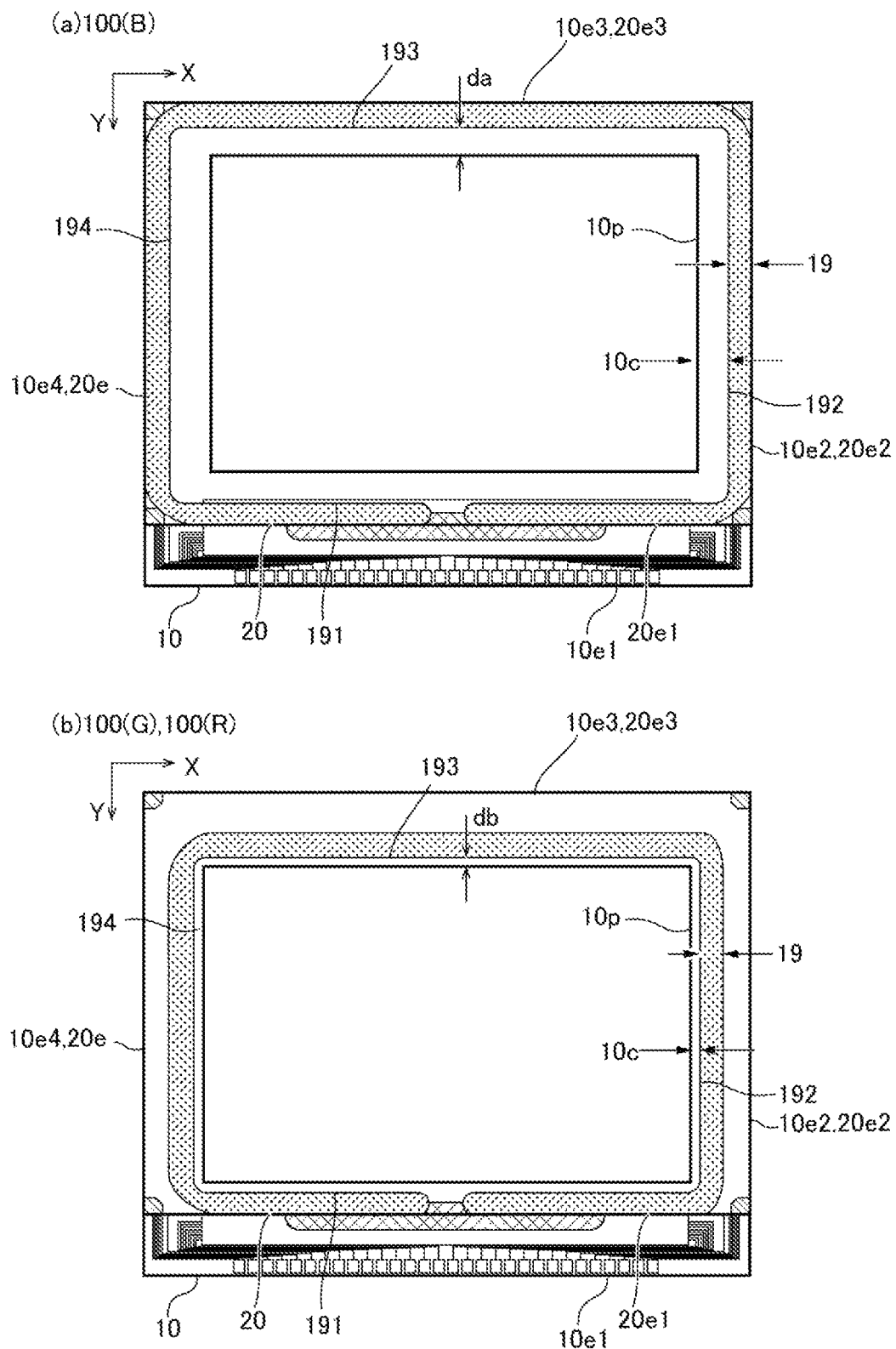
FIG. 15 is an explanatory diagram illustrating a projection-type display device according to a sixth embodiment of the present disclosure.

FIG. 15 is an explanatory diagram illustrating a projection-type display device 2000 according to a sixth embodiment of the present disclosure. FIG. 15 illustrates a planar structure of three liquid crystal devices 100 used in the projection-type display device 2000. In FIG. 15, the upper portion (a) illustrates a liquid crystal device 100(B) for blue, and a lower portion (b) illustrates a liquid crystal device 100(R) for red and a liquid crystal device 100(G) for green. As in the second embodiment, in the present embodiment, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. More specifically, as illustrated in FIG. 15, the seal material 19 of the liquid crystal device 100(B) for blue extends so as to be in contact with the edge of the second substrate 20, whereas, in the liquid crystal device 100(G) for green and the liquid crystal device 100(R) for red, the longer side 193 and the shorter sides 192 and 194 of the seal material 19 are spaced apart from the edge of the seal material 19. However, in the three liquid crystal devices 100, the size of the display region 10p and the outer dimension are equal to each other. Thus, the space da between the display region 10p and the seal material 19 of the liquid crystal device 100(B) for blue is wider than the space db between the display region 10p and the seal material 19 of the liquid crystal device 100(G) for green and the liquid crystal device 100(R) for red. With this configuration, the volume V2 of liquid crystal in the display region 10p is equal between the liquid crystal device 100(B) for blue, the liquid crystal device 100(G) for green, and the liquid crystal device 100(R) for red, whereas the volume V1 of liquid crystal at the inner side of the seal material 19 of the liquid crystal device 100(B) for blue is greater than the volume V1 of liquid crystal at the inner side of the seal material 19 of the liquid crystal device 100(G) for green and the liquid crystal device 100(R) for red.

As described above, as in the second embodiment, in each of the liquid crystal devices 100 in the projection-type display device 2000 according to the present embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10p to a level equivalent to the liquid crystal device 100(R) for red and the liquid crystal device 100(G) for green, achieving an effect similar to the second embodiment.

Seventh Embodiment

Figure 16:
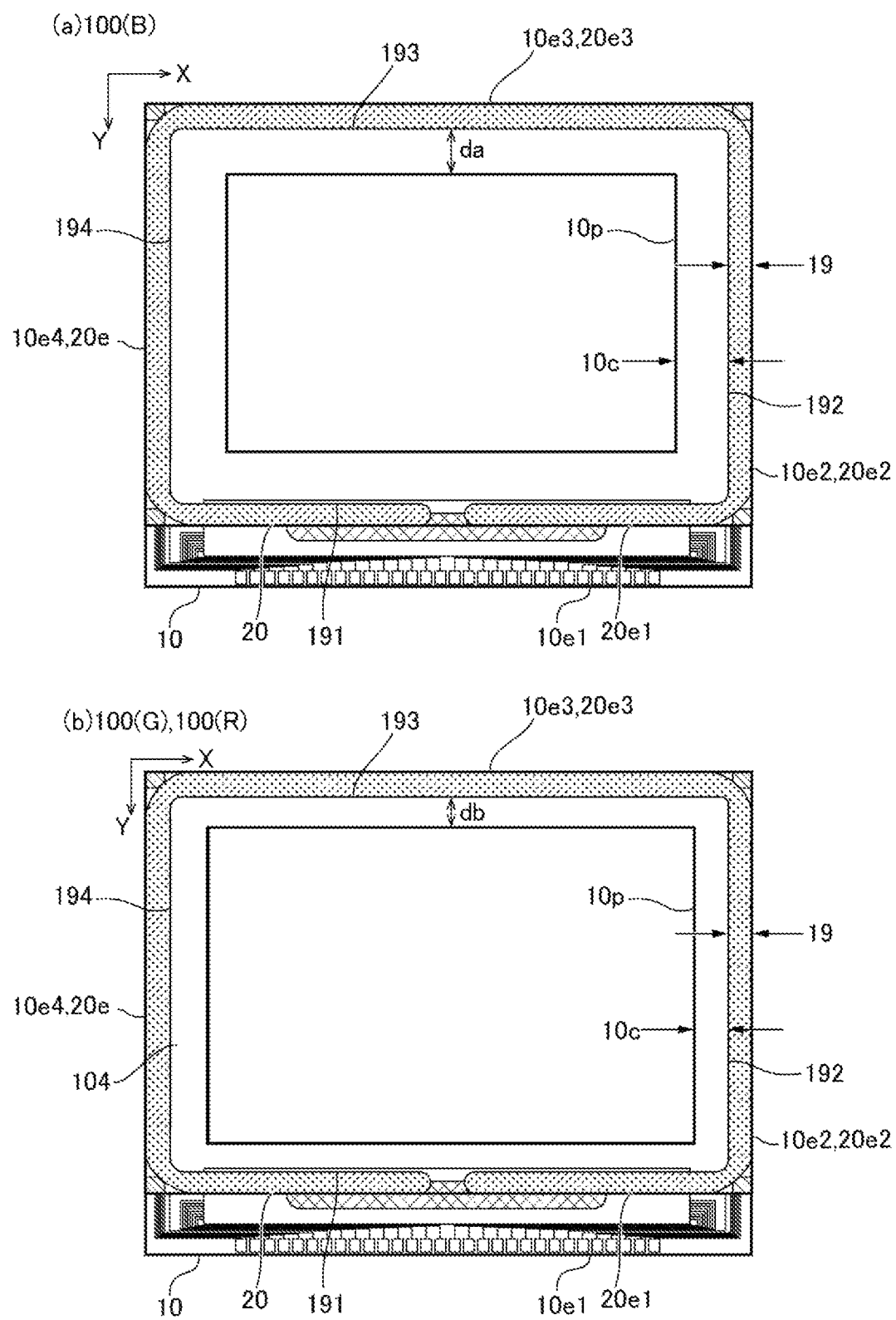
FIG. 16 is an explanatory diagram illustrating a projection-type display device according to a seventh embodiment of the present disclosure.

FIG. 16 is an explanatory diagram illustrating a projection-type display device 2000 according to a seventh embodiment of the present disclosure. FIG. 16 illustrates a planar structure of three liquid crystal devices 100 used in the projection-type display device 2000. In FIG. 16, the upper portion (a) illustrates a liquid crystal device 100(B) for blue, and the lower portion (b) illustrates a liquid crystal device 100(R) for red and a liquid crystal device 100(G) for green. As in the second embodiment, in the present embodiment, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. More specifically, as illustrated in FIG. 16, while the three liquid crystal devices 100 have the same outer dimension, the display region 10p of the liquid crystal device 100(B) for blue has an area smaller than that of the display region 10p of the liquid crystal device 100(G) for green and that of the display region 10p of the liquid crystal device 100(R) for red. Thus, the space da between the display region 10p and the seal material 19 of the liquid crystal device 100(B) for blue is wider than the space db between the display region 10p and the seal material 19 of the liquid crystal device 100(G) for green and the liquid crystal device 100(R) for red. With this configuration, the three liquid crystal devices 100 have the same volume V1 of liquid crystal at the inner side of the seal material 19, whereas the volume V2 of liquid crystal in the display region 10p of the liquid crystal device 100(B) for blue is smaller than the volume V2 of liquid crystal in the display region 10p of the liquid crystal device 100(G) for green and the liquid crystal device 100(R) for red.

As described above, in each of the liquid crystal devices 100 in the projection-type display device 2000 according to the present embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10p to a level equivalent to the liquid crystal device 100(R) for red and the liquid crystal device 100(G) for green, achieving an effect similar to the second embodiment.

Eighth Embodiment

Figure 17:
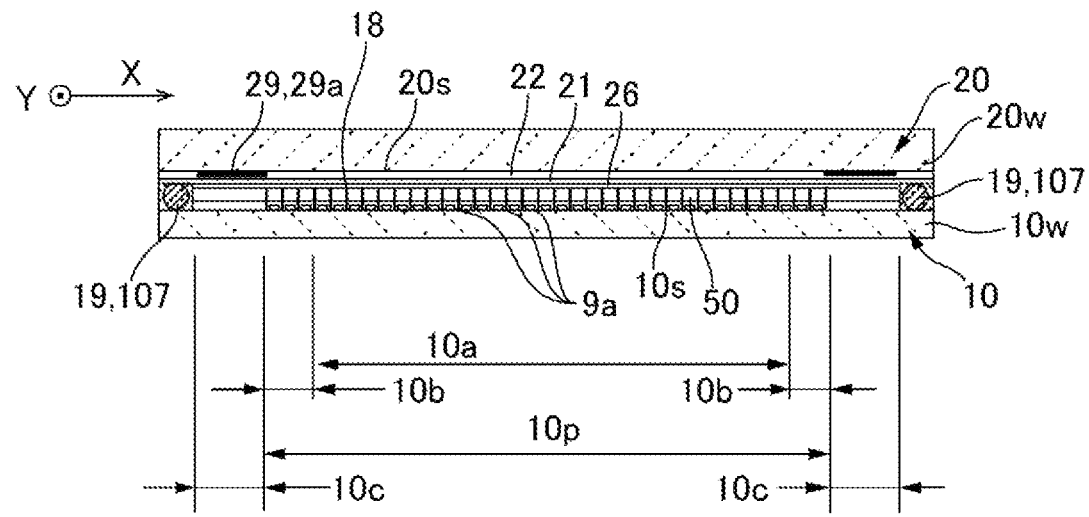
FIG. 17 is an explanatory diagram illustrating a projection-type display device according to an eighth embodiment of the present disclosure.
Figure 17:
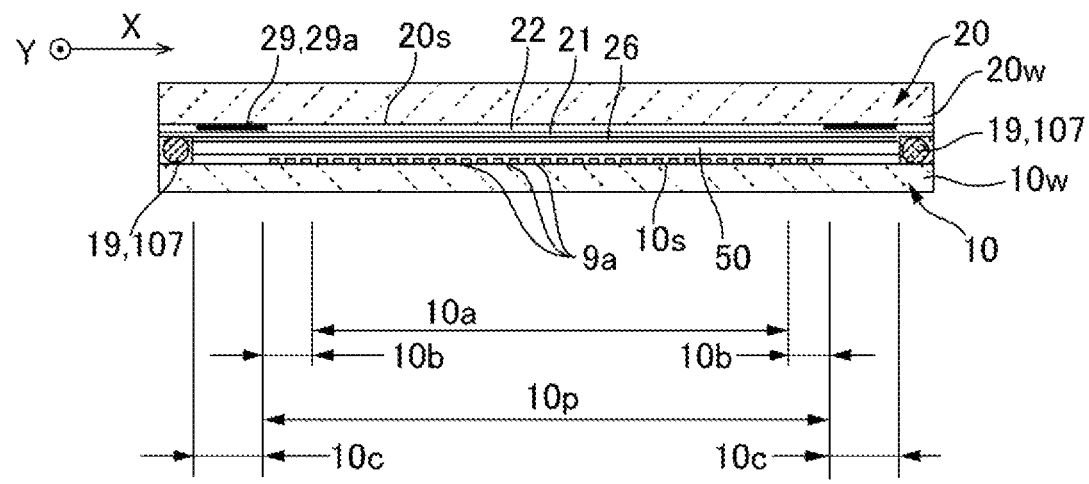

FIG. 17 is an explanatory diagram illustrating a projection-type display device 2000 according to an eighth embodiment of the present disclosure. FIG. 16 illustrates a planar structure of three liquid crystal devices 100 used in the projection-type display device 2000. In FIG. 17, the upper portion (a) illustrates a liquid crystal device 100(B) for blue, and the lower portion (b) illustrates a liquid crystal device 100(R) for red and a liquid crystal device 100(G) for green. As in the second embodiment, in the present embodiment, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. More specifically, as illustrated in FIG. 17, a pillar-shaped spacer 18 that regulates a space between the first substrate 10 and the second substrate 20 is formed in the display region 10p of the liquid crystal device 100(B) for blue. Such a pillar-shaped spacer 18, for example, includes an insulating item that protrudes on the first substrate 10 toward the second substrate 20 at a position that overlaps with a light shielding portion such as a wiring line, and is brought into contact with the second substrate 20 to regulate the space between the first substrate 10 and the second substrate 20.

In contrast, no pillar-shaped space 18 is formed in the display region 10p of the liquid crystal device 100(G) for green and the display region 10p of the liquid crystal device 100(R) for red. Thus, the volume V2 of liquid crystal in the display region 10p of the liquid crystal device 100(B) for blue is smaller than the volume V2 of liquid crystal in the display region 10p of the liquid crystal device 100(G) for green and the liquid crystal device 100(R) for red. Note that, with the pillar-shaped spacer 18, the volume V2 of liquid crystal at the inner side of the seal material 19 of the liquid crystal device 100(B) for blue is smaller than the volume V2 of liquid crystal at the inner side of the seal material 19 of the liquid crystal device 100(G) for green and the liquid crystal device 100(R) for red. In this case, the liquid crystal volume ratio V1/V2 of the liquid crystal device 100(B) for blue is greater than the liquid crystal volume ratio V1/V2 of the liquid crystal device 100(G)) for green and the liquid crystal volume ratio V1/V2 of a third liquid crystal device (liquid crystal device 100(R) for red).

As described above, as in the second embodiment, in each of the liquid crystal devices 100 in the projection-type display device 2000 according to the present embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10p to a level equivalent to the liquid crystal device 100(R) for red and the liquid crystal device 100(G) for green, achieving an effect similar to the second embodiment.

First Modification Example of Eighth Embodiment

Figure 18:
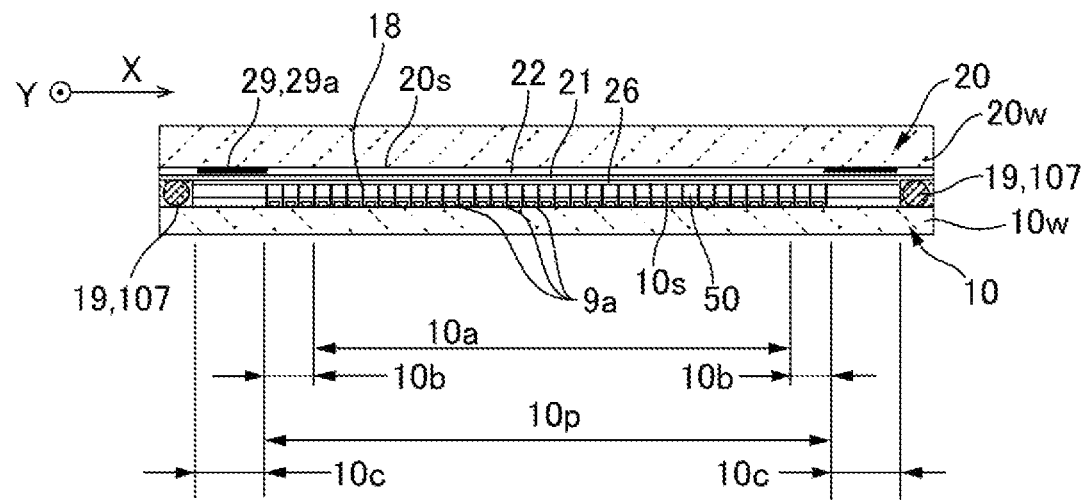
FIG. 18 is an explanatory diagram illustrating a projection-type display device according to a first modification example of the eighth embodiment of the present disclosure.
Figure 18:
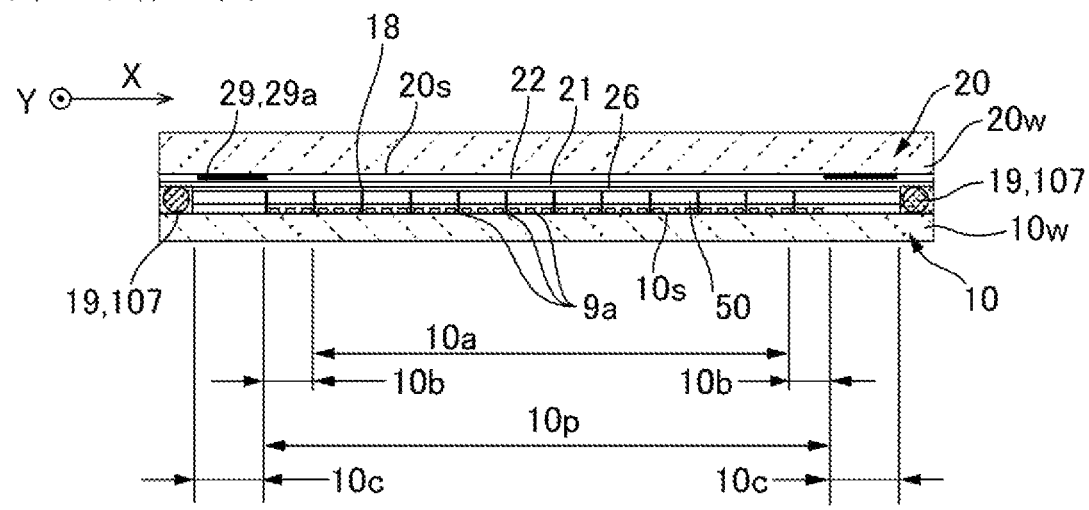

FIG. 18 is an explanatory diagram illustrating a projection-type display device 2000 according to a first modification example of the eighth embodiment of the present disclosure. FIG. 18 illustrates a structure in cross section of three liquid crystal devices 100 used in the projection-type display device 2000. In FIG. 18, the upper portion (a) illustrates a liquid crystal device 100(B) for blue, and the lower portion (b) illustrates a liquid crystal device 100(R) for red and a liquid crystal device 100(G) for green. As in the eighth embodiment, in the present embodiment, the pillar-shaped spacer 18 that regulates the space between the first substrate 10 and the second substrate 20 is formed in the display region 10p of the liquid crystal device 100(B) for blue. In the present embodiment, the pillar-shaped spacer 18 is also formed in the display region 10p of the liquid crystal device 100(G) for green and the display region 10p of the liquid crystal device 100(R) for red. In addition, in the display region 10p of the liquid crystal device 100(B) for blue, the density of arrangement of the pillar-shaped spacer 18 is lower than that in the display region 10p of the liquid crystal device 100(G) for green and the liquid crystal device 100(R) for red. With this configuration, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. Thus, as in the eighth embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10p to a level equivalent to the liquid crystal device 100(R) for red and the liquid crystal device 100(G) for green, achieving an effect similar to the second embodiment.

Second Modification Example of Eighth Embodiment

Figure 19:
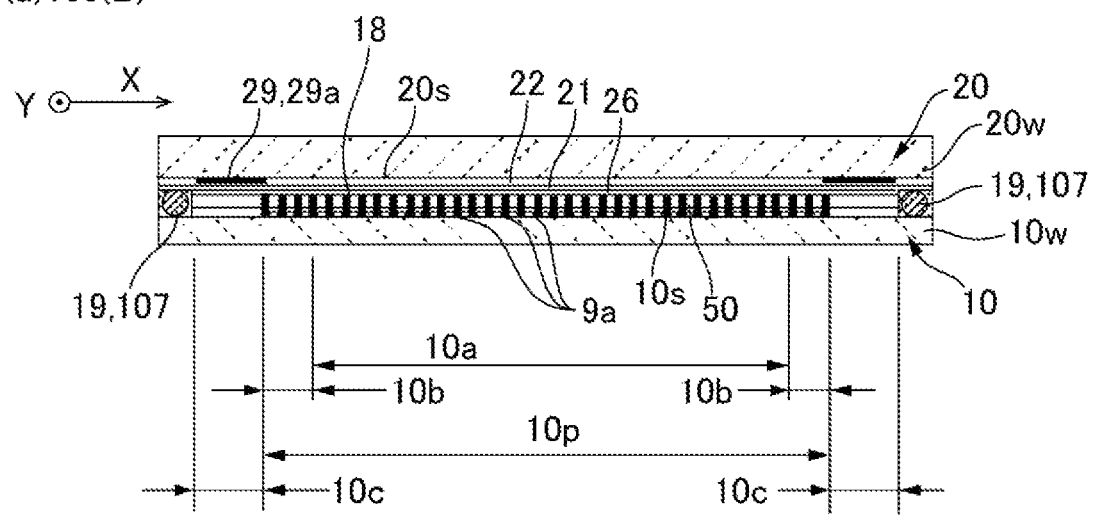
FIG. 19 is an explanatory diagram illustrating a projection-type display device according to a second modification example of the eighth embodiment of the present disclosure.
Figure 19:
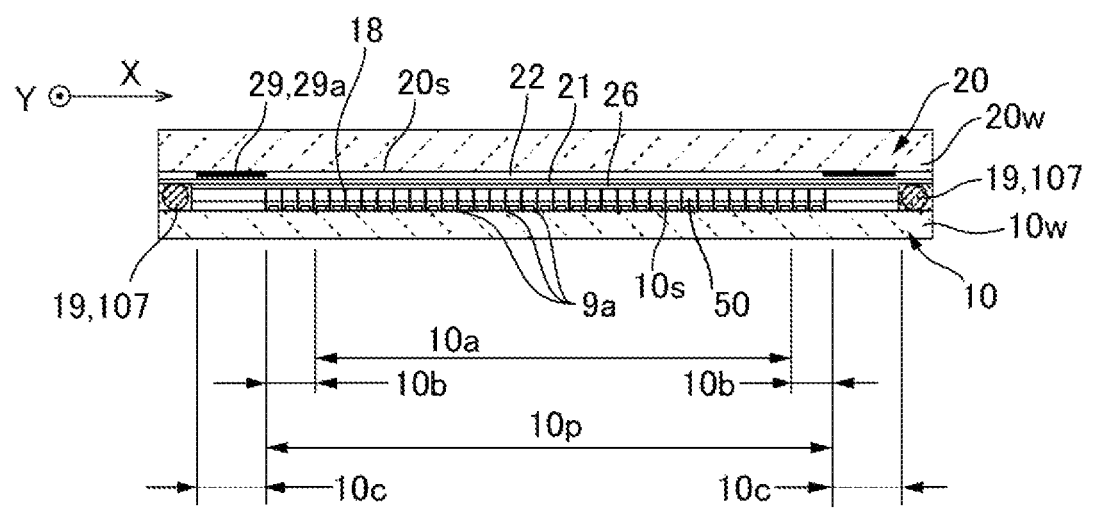

FIG. 19 is an explanatory diagram illustrating a projection-type display device 2000 according to a second modification example of the eighth embodiment of the present disclosure. FIG. 19 illustrates a structure in cross section of three liquid crystal devices 100. In FIG. 19, the upper portion (a) illustrates a liquid crystal device 100(B) for blue, and the lower portion (b) illustrates a liquid crystal device 100(R) for red and a liquid crystal device 100(G) for green. As in the eighth embodiment, in the present embodiment, the pillar-shaped spacer 18 that regulates the space between the first substrate 10 and the second substrate 20 is formed in the display region 10$p$ of the liquid crystal device 100(B) for blue. In the present embodiment, the pillar-shaped spacer 18 is also formed in the display region 10$p$ of the liquid crystal device 100(G) for green and the display region 10$p$ of the liquid crystal device 100(R) for red, the number of pillar-shaped spacers 18 per unit area in these regions being equal to that in the display region 10$p$ of the liquid crystal device 100(B) for blue. However, the pillar-shaped spacer 18 formed in the liquid crystal device 100(B) for blue is larger than the pillar-shaped spacer 18 formed in the liquid crystal device 100(G) for green and the pillar-shaped spacer 18 formed in the liquid crystal device 100(R) for red. With this configuration, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. Thus, as in the eighth embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10$p$ to a level equivalent to the liquid crystal device 100(R) for red and the liquid crystal device 100(G) for green, achieving an effect similar to the second embodiment.

Ninth Embodiment

Figure 20:
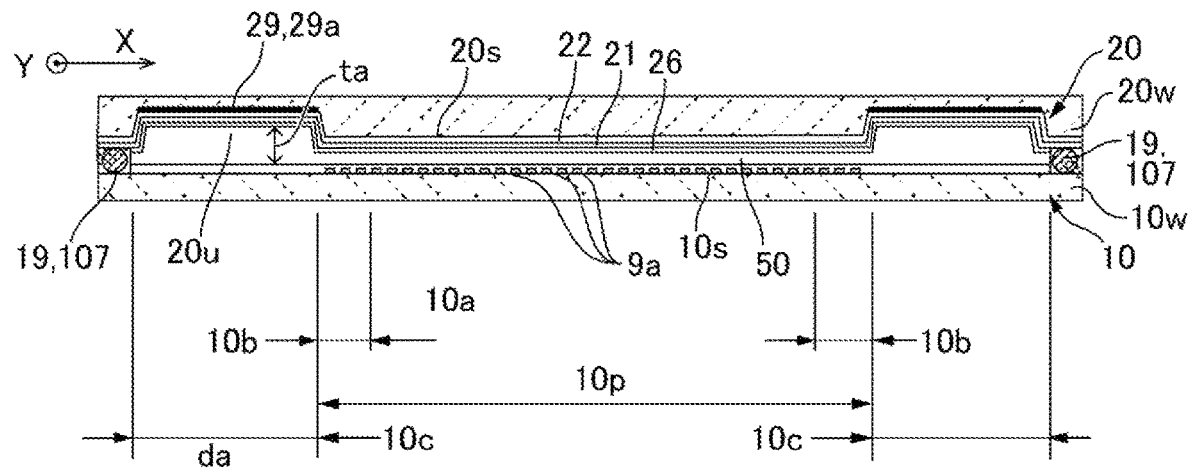
FIG. 20 is an explanatory diagram illustrating a projection-type display device according to a ninth embodiment of the present disclosure.
Figure 20:
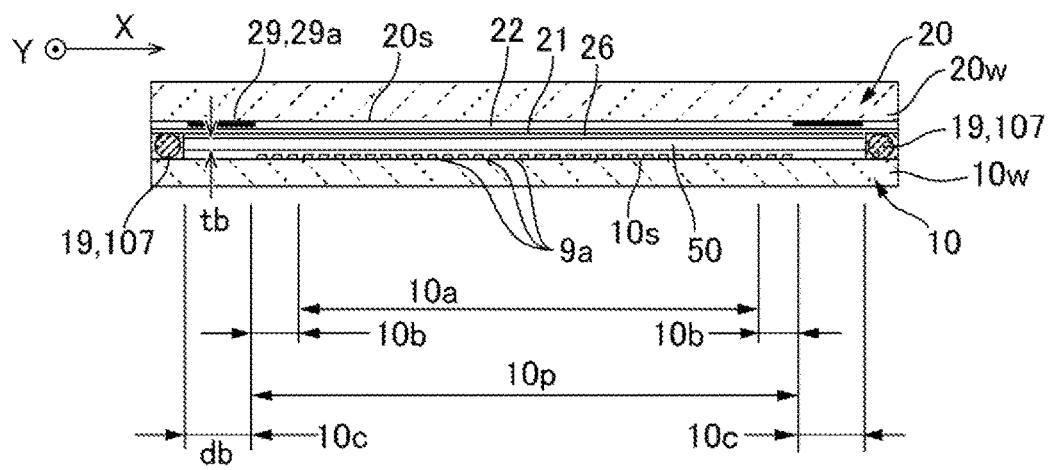

FIG. 20 is an explanatory diagram illustrating a projection-type display device 2000 according to a ninth embodiment of the present disclosure. FIG. 20 illustrates a structure in cross section of three liquid crystal devices 100 used in the projection-type display device 2000. In FIG. 20, the upper portion (a) illustrates a liquid crystal device 100(B) for blue, and the lower portion (b) illustrates a liquid crystal device 100(R) for red and a liquid crystal device 100(G) for green. It may be possible to combine the characteristic portions in each of the embodiments described above to make the liquid crystal volume ratio V1/V2 of the liquid crystal device 100(B) for blue greater than the liquid crystal volume ratio V1/V2 of the liquid crystal device 100(G) for green and the liquid crystal volume ratio V1/V2 of the liquid crystal device 100(R) for red.

For example, as in the second embodiment, in the present embodiment, a thickness to of the liquid crystal layer 50 between the display region 10$p$ and the seal material 19 of the liquid crystal device 100(B) for blue is thicker than the thickness tb of the liquid crystal layer 50 between the display region 10$p$ and the seal material 19 of the liquid crystal device 100(G) for green and the liquid crystal device 100(R) for red, as illustrated in FIG. 20. More specifically, in the liquid crystal device 100(B) for blue, the recessed portion 20$u$ is formed between the display region 10$p$ and the seal material 19 in the second substrate 20, while no recessed portion is formed between the display region 10$p$ and the seal material 19 in the liquid crystal device 100(G) for green and the liquid crystal device 100(R) for red.

In addition, the space da between the display region 10$p$ and the seal material 19 of the liquid crystal device 100(B) for blue is wider than the space db between the display region 10$p$ and the seal material 19 of the liquid crystal device 100(G) for green and the space db between the display region 10$p$ and the seal material 19 of the liquid crystal device 100(R) for red. Thus, the volume V2 of liquid crystal in the display region 10$p$ is equal between the liquid crystal device 100(B) for blue, the liquid crystal device 100(G) for green, and the liquid crystal device 100(R) for red, whereas the volume V1 of liquid crystal at the inner side of the seal material 19 of the liquid crystal device 100(B) for blue is greater than the volume V1 of liquid crystal at the inner side of the seal material 19 of the liquid crystal device 100(G) for green and the liquid crystal device 100(R) for red. With this configuration, the liquid crystal volume ratio V1/V2 of the liquid crystal device 100(B) for blue is greater than the liquid crystal volume ratio V1/V2 of the liquid crystal device 100(G) for green and the liquid crystal volume ratio V1/V2 of the liquid crystal device 100(R) for red. Thus, as in the second embodiment, even when more impurities are generated in the liquid crystal device 100(B) for blue as compared with the liquid crystal device 100(R) for red and the liquid crystal device 100(G) for green, it is possible to suppress the influence of impurities on display in the display region 10$p$ to a level equivalent to the liquid crystal device 100(R) for red and the liquid crystal device 100(G) for green, achieving an effect similar to the second embodiment.

Tenth Embodiment

Figure 21:
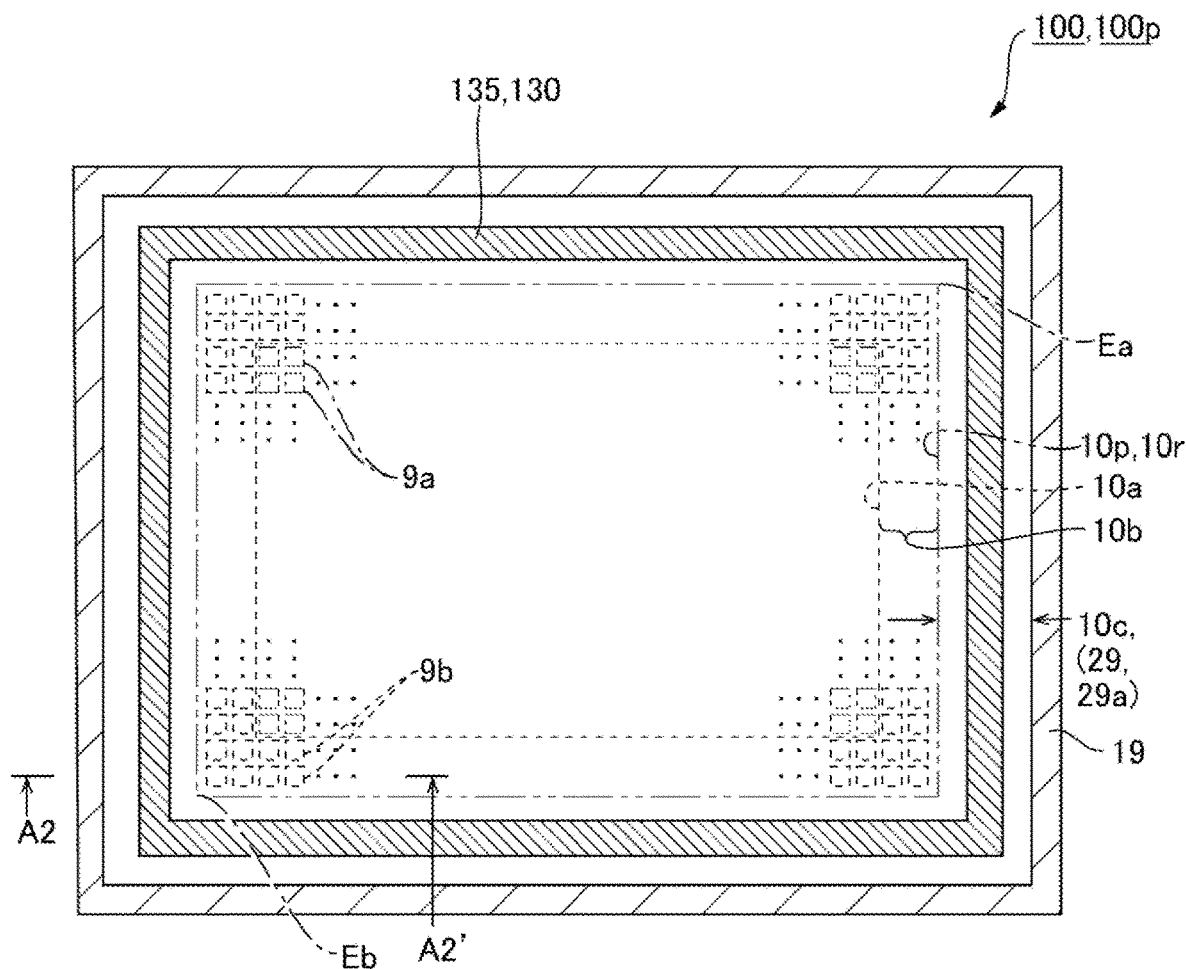
FIG. 21 is an explanatory diagram illustrating a configuration in plan view of a liquid crystal device according to a tenth embodiment of the present disclosure.
Figure 22:
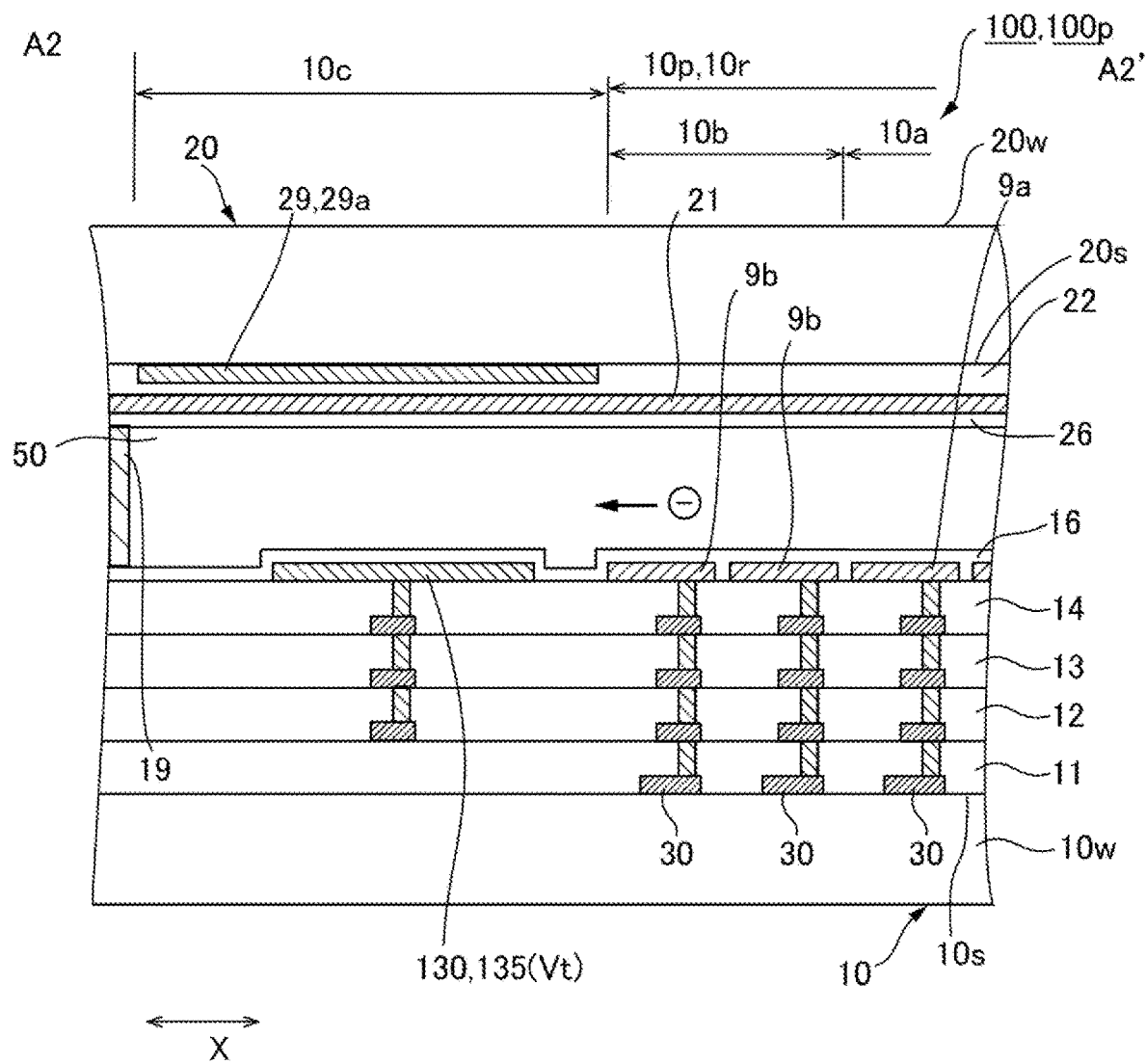
FIG. 22 is an explanatory diagram schematically illustrating a cross section taken along the A2-A2' of the liquid crystal device illustrated in FIG. 21.
Figure 23:
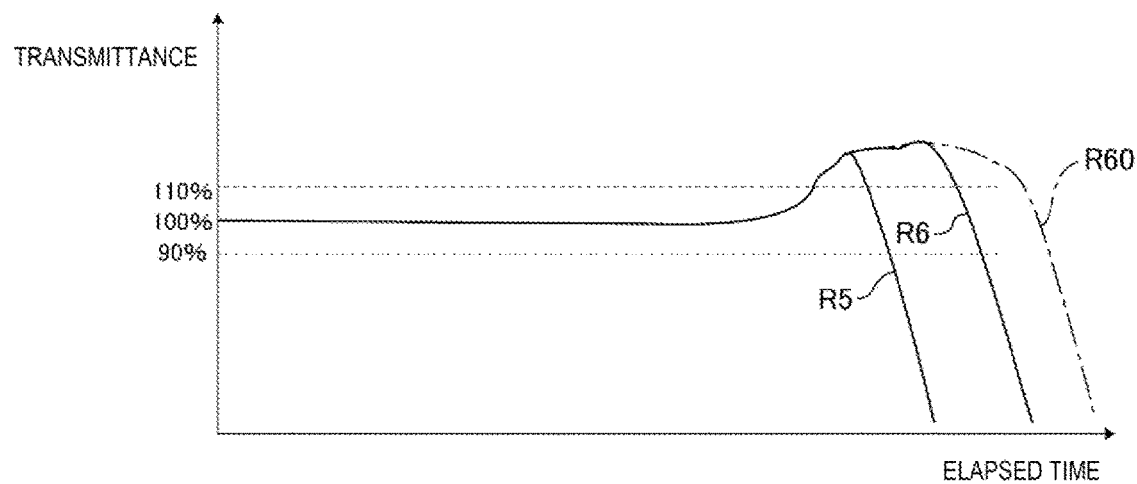
FIG. 23 is an explanatory diagram illustrating an effect of the tenth embodiment.

FIG. 21 is an explanatory diagram illustrating a configuration in plan view of a liquid crystal device 100 according to a tenth embodiment of the present disclosure. FIG. 21 illustrates a region where the first substrate 10 and the second substrate 20 overlap with each other. FIG. 22 is an explanatory diagram schematically illustrates a cross section taken along A2-A2' of the liquid crystal device 100 illustrated in FIG. 21. FIG. 23 is an explanatory view illustrating an effect of the tenth embodiment.

In the present embodiment, the liquid crystal panel 100$p$ of each of all the liquid crystal devices 100 includes a trapping electrode 130 configured to pull ionic impurities in the display region 10$p$ toward the outside of the display region 10$p$, the trapping electrode 130 being provided outside of the display region 10$p$ of the first substrate 10, as illustrated in FIGS. 21 and 22. In the present embodiment, the trapping electrode 130 includes an electrode 135 to which a constant potential is applied. For example, a voltage of +1.5V is applied across the electrode 135 and the common electrode 21. Thus, negative ionic impurities in the display region 10$p$ are drawn by the trapping electrode 130 due to a horizontal electric field generated between the electrode 135 and the dummy pixel electrode 9$b$. In the present embodiment, under the control by the control unit 2010 illustrated in FIGS. 2 and 3, when a result of measurement of the transmittance by the transmittance measuring device 2500 changes by 10% relative to a default value, temperatures of the liquid crystal layer 50 are raised, and then, the potential described above is applied to the trapping electrode 130. In addition, it may be possible to apply electric power to the trapping electrode 130 before the result of measurement of the transmittance by the transmittance measuring device 2500 changes by 10% relative to the default value.

Here, the electrode 135 is provided, at least, outside of two corner portions Ea and Eb located in the diagonal direction of the display region 10$p$. In the present embodiment, the electrode 135 is formed into a frame shape surrounding the periphery of the display region 10p. Note that a negative voltage may be applied across the electrode 135 and the common electrode 21.

With such a mode, ionic impurities reach the outside of the display region 10p and stay there, due to a horizontal electric field generated between the electrode 135 and the dummy pixel electrode 9b, in addition, for example, to flow of the liquid crystal molecules 51 at the time of driving the liquid crystal layer 50. Thus, as illustrated in FIG. 23, it is possible to retard the rapid decrease in the transmittance of the liquid crystal panel 100p from the property indicated by the solid line R5 to the property indicated by the solid line R6, by employing the configuration of raising temperatures of the liquid crystal layer 50 on the basis of a mode that does not employ either the configuration of raising temperatures of the liquid crystal layer 50 described in the first embodiment or the configuration using an electric field described in the present embodiment. In addition, by employing both the configuration of raising temperatures of the liquid crystal layer 50 described in the first embodiment and the configuration using the electric field described in the present embodiment, it is possible to retard the rapid decrease in the transmittance of the liquid crystal panel 100p from the property indicated by the solid line R6 to the property indicated by the long dashed short dashed line R60. Thus, it is possible to suppress the influence of impurities on display in the display region 10p. This makes it possible for the projection-type display device 2000 to display high-quality image for a long period of time.

Eleventh Embodiment

Figure 24:
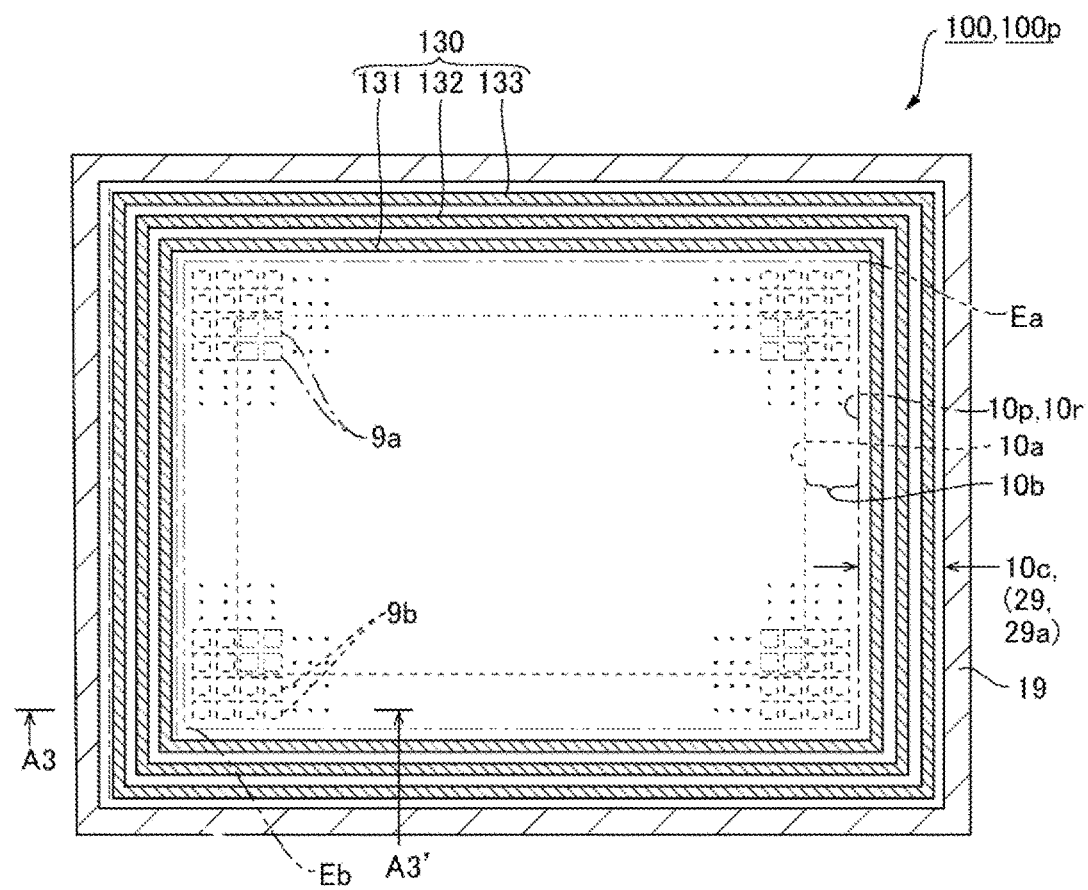
FIG. 24 is an explanatory diagram illustrating a configuration in plan view of a liquid crystal device according to an eleventh embodiment of the present disclosure.
Figure 25:
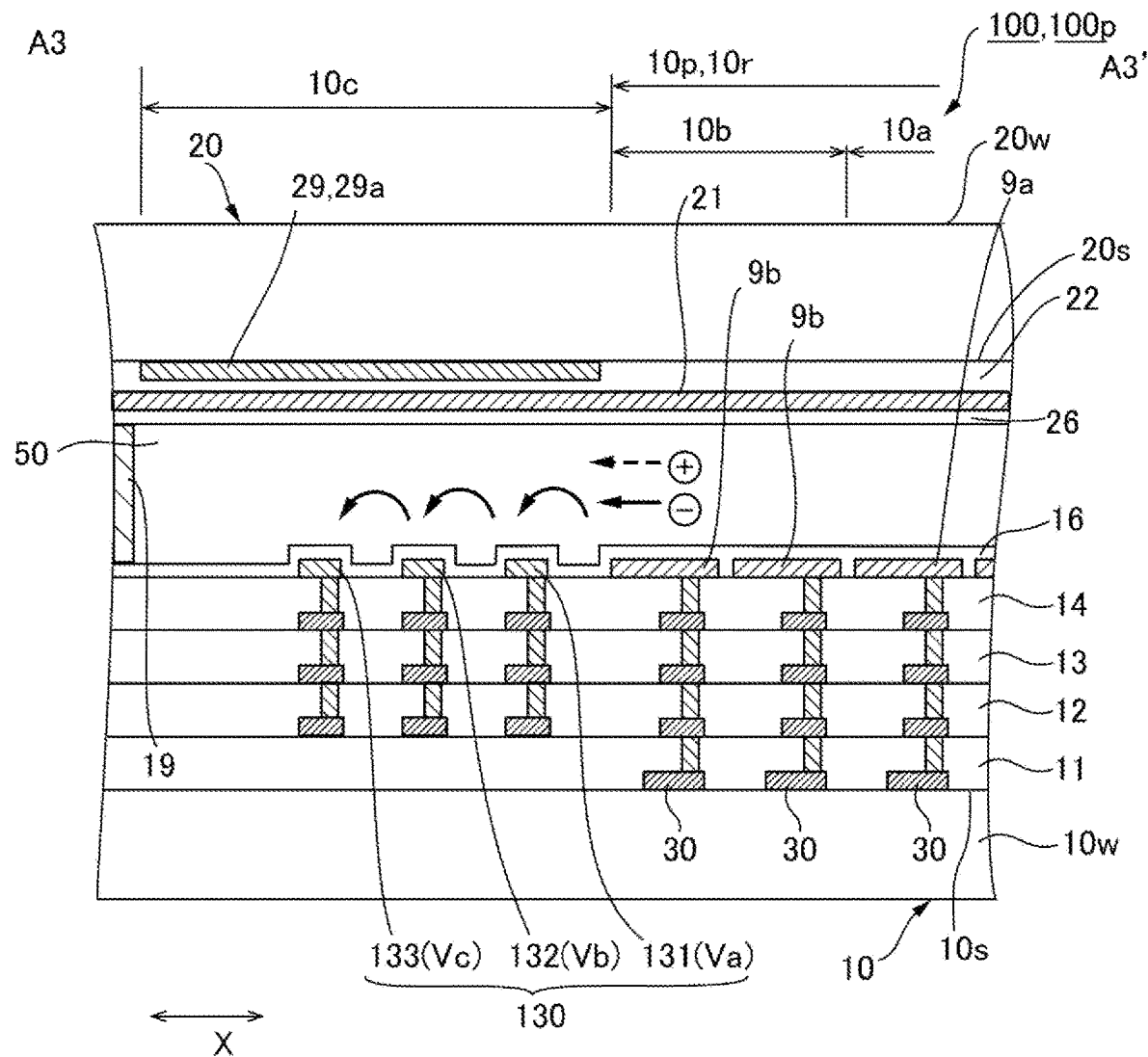
FIG. 25 is an explanatory diagram schematically illustrating a cross section taken along the A3-A3' of the liquid crystal device illustrated in FIG. 24.
Figure 26:
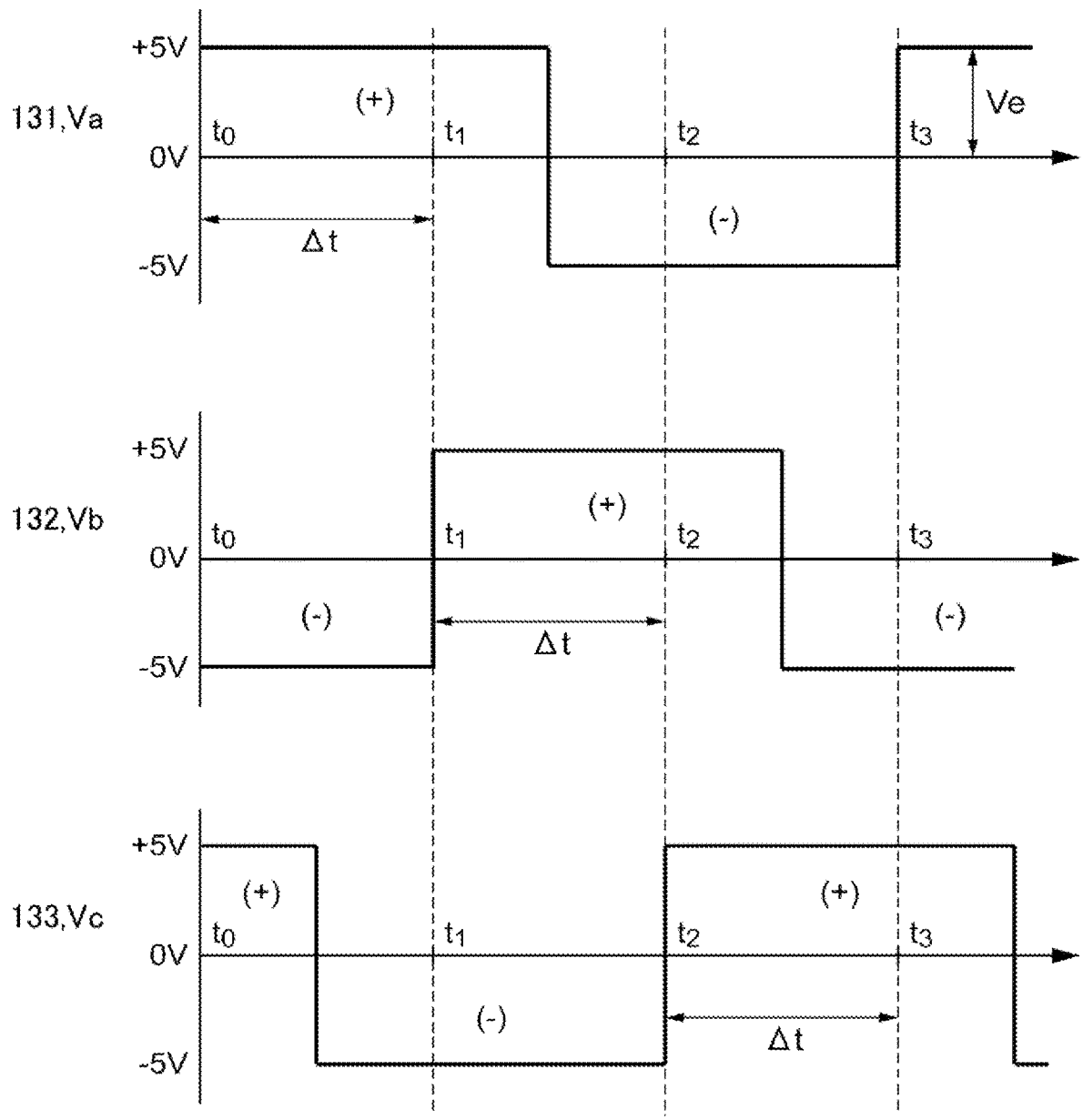
FIG. 26 is an explanatory diagram illustrating an example of a signal applied to a trapping electrode illustrated in FIG. 24.

FIG. 24 is an explanatory diagram illustrating a configuration in plan view of a liquid crystal device 100 according to an eleventh embodiment of the present disclosure. FIG. 24 illustrates a region where the first substrate 10 and the second substrate 20 overlap with each other. FIG. 25 is an explanatory diagram schematically illustrating a cross section taken along A3-A3' of the liquid crystal device 100 illustrated in FIG. 24. FIG. 26 is an explanatory diagram illustrating one example of a signal applied to a trapping electrode 130 illustrated in FIG. 24. Note that the basic configurations of the present embodiment is similar to that in the first embodiment and the tenth embodiment. Thus, the same reference characters are attached to the same portions, and explanation thereof will not be repeated.

As in the tenth embodiment, in the present embodiment, the liquid crystal panel 100p of each of all the liquid crystal devices 100 also includes the trapping electrode 130 configured to pull ionic impurities in the display region 10p toward the outside of the display region 10p, the trapping electrode 130 being provided outside of the display region 10p of the first substrate 10, as illustrated in FIGS. 24 and 25. In the present embodiment, the first substrate 10 of the liquid crystal device 100 includes, as the trapping electrode 130, a first electrode 131 provided in a region between the display region 10p and the seal material 19 in plan view and to which a first signal Va is supplied, and a second electrode 132 provided in a region between the first electrode 131 and the seal material 19 in plan view and to which a second signal Vb having a phase different from the first signal Va is supplied. In addition, the first substrate 10 also includes a third electrode 133 provided in a region between the second electrode 132 and the seal material 19 in plan view and to which a third signal Vc having a phase different from the first signal Va and the second signal Vb is supplied. In the present embodiment, under the control by the control unit 2010 illustrated in FIGS. 2 and 3, when a result of measurement of the transmittance by the transmittance measuring device 2500 changes by 10% relative to a default value, temperatures of the liquid crystal layer 50 are raised, and then, the potential described above is applied to the trapping electrode 130. In addition, it may be possible to apply electric power to the trapping electrode 130 before the result of measurement of the transmittance by the transmittance measuring device 2500 changes by 10% relative to the default value.

Here, the first electrode 131, the second electrode 132, and the third electrode 133 are provided outside of two corner portions Ea and Eb located in the diagonal direction of the display region 10p. In the present embodiment, the first electrode 131, the second electrode 132, and the third electrode 133 are formed into a frame shape surrounding the periphery of the display region 10p.

In the present embodiment, before the first signal Va supplied to the first electrode 131 transitions from a positive polarity (+) to a negative polarity (−), the second signal Vb supplied to the second electrode 132 transitions from a negative polarity (−) to a positive polarity (+), as illustrated, for example, in FIG. 26. In addition, before the second signal Vb transitions from a positive polarity (+) to a negative polarity (−), the third signal Vc applied to the third electrode 133 transitions from a negative polarity (−) to a positive polarity (+). Furthermore, before the first signal Va applied to the first electrode 131 transitions from a negative polarity (−) to a positive polarity (+), the second signal Vb applied to the second electrode 132 transitions from a positive polarity (+) to a negative polarity (−). In addition, before the second signal Vb transitions from a negative polarity (−) to a positive polarity (+), the third signal Vc applied to the third electrode 133 transitions from a positive polarity (+) to a negative polarity (−).

Here, the second signal Vb provided to the second electrode 132 is delayed by a Δt time in the time axis t relative to the first signal Va provided to the first electrode 131. Similarly, the third signal Vc provided to the third electrode 133 is delayed by a Δt time in the time axis t relative to the second signal Vb provided to the second electrode 132. For example, assuming that the Δt time is ⅓ cycle, the alternating signals provided to each of the first electrode 131, the second electrode 132, and the third electrode 133 are shifted in phase by ⅓ cycle with each other. In other words, the maximum amount of phase shift Δt at which the potentials of the first electrode 131, the second electrode 132, and the third electrode 133 are shifted in phase with each other is a value obtained by dividing one cycle of the alternating signal by the number of electrodes n.

Note that the alternating signals of the rectangular wave illustrated in FIG. 26 transition between a high potential (5V) and a low potential (−5V) with the reference potential being 0V. However, the setting of the reference potential, the high potential, and the low potential is not limited to this example.

With such a configuration, from time t0 to time t1 illustrated in FIG. 26, during a period of time when the first signal Va supplied to the first electrode 131 has a positive polarity (+) of 5V, the second signal Vb supplied to the second electrode 132 adjacent to the first electrode 131 has a negative polarity of −5V. Thus, an electric field running from the first electrode 131 toward the second electrode 132 is generated between the first electrode 131 and the second electrode 132. In addition, when the second signal Vb supplied to the second electrode 132 has a positive polarity (+) of 5V in a period from time t1 to time t2, the third potential supplied to the third electrode 133 adjacent to the second electrode 132 has a negative polarity (−) of −5V. Thus, an electric field running from the second electrode 132 toward the third electrode 133 is generated between the second electrode 132 and the third electrode 133.

Furthermore, when the third signal Vc supplied to the third electrode 133 has a positive polarity (+) of 5V in a period from time t2 to time t3, the second signal Vb supplied to the second electrode 132 adjacent to the third electrode 133 transitions from a positive polarity (+) of 5V to a negative polarity (−) of −5. Thus, in a period of time corresponding to one cycle of the alternating signal from time t0 to time t3, the distribution of the electric field between the electrodes of the first electrode 131, the second electrode 132, and the third electrode 133 is scrolled in terms of time from the first electrode 131 to the third electrode 133.

Here, ionic impurities having a positive polarity (+) may exist and ionic impurities having a negative polarity (−) may exist. The ionic impurities having the positive polarity (+) or the negative polarity (−) are drawn toward the first electrode 131 in response to the polarity of the first potential of the first electrode 131. If the ionic impurities that have been drawn toward the first electrode 131 are left there as they are, the ionic impurities gradually accumulate and may have an influence on electronic parting or display in the region 10a. Thus, the ionic impurities that have been drawn toward the first electrode 131 are sequentially moved to the second electrode 132 or the third electrode 133. This enables ionic impurities having a positive polarity (+) or negative polarity (−) drawn toward the first electrode 131, to be moved through the second electrode 132 to the third electrode 133. Thus, in association with the movement in the direction of electric field described above from the first electrode 131 to the third electrode 133, ionic impurities are swept from the display region 10p to the outside of the display region 10p. Such operations may be performed for either a period of time in which an image is displayed or a period of time during which displaying the image is stopped.

Note that, in order to reliably sweep and collect ionic impurities at the third electrode 133 in association with scrolling of an electric field, the frequency of the alternating signal is determined on the basis of the velocity of movement of the ionic impurities. Note that the alternating signal applied to the trapping electrode 130 is not limited to the alternating signal of the rectangular wave illustrated in FIG. 26. For example, in a case of the alternating signal of the rectangular wave illustrated in FIG. 26, the period of time in which the potential of the signal has a positive polarity (+) is equal to the period of time in which the potential has a negative polarity (−). However, for example, it may be possible to employ an alternating signal configured such that the period of time in which the potential has a negative polarity (−) is longer than the period of time in which the potential has a positive polarity (+). In addition, while the alternating signal of the rectangular wave may oscillate between potentials of binary values of 5V and −5V, the waveform may be set such that the potential thereof transitions between three or more different values. Furthermore, the alternating signals applied to the individual trapping electrodes may be sine waves having phases different from each other in a period of one cycle.

With such a mode, ionic impurities reach the outside of the display region 10p and stay there, due to an electric field generated between the first electrode 131, the second electrode 132, and the third electrode 133, in addition, for example, to flow of the liquid crystal molecules 51 at the time of driving the liquid crystal layer 50. Thus, it is possible to suppress the influence of impurities on display in the display region 10p. This makes it possible for the projection-type display device 2000 to display a high-quality image for a long period of time.

Note that, in the present embodiment, the trapping electrode 130 includes the three electrodes. However, the trapping electrode 130 may include two electrodes or may include four or more electrodes. In addition, it may be possible to employ a mode in which, in the trapping electrode 130, an alternating signal is applied across two electrodes.

Other Projection-Type Display Device

In the embodiment 2-10 described above, the liquid crystal volume ratio V1/V2 has the following relationship:

$$100(B) > 100(G) \geq 100(R)$$

However, it may be possible to employ a mode in which the liquid crystal volume ratio V1/V2 has any of the following relationships:

$$100(B) \geq 100(G) > 100(R)$$

$$100(B) > 100(G) \geq 100(R)$$

In addition, the projection-type display device 2000 may be configured to use, as a light source unit, an LED light source configured to emit light in various colors and the like to supply light in various colors emitted from the LED light source to another liquid crystal device.

The display device to which the present disclosure is applied is not limited to the projection-type display device 2000 according to each of the embodiments described above. For example, the display device may be used in a projection-type head up display, a direct-view-type head-mounted display, a personal computer, a smartphone, a digital still camera, a liquid crystal television, or other electronic devices.

What is claimed is:

1. A method of driving a display device, comprising:
after a transmittance of a liquid crystal panel changes by 10%, controlling a temperature of a liquid crystal layer to be not less than 60° C. and not more than a nematic-isotropic phase transition temperature Tni-20° C.

2. The method of driving the display device according to claim 1, wherein
the liquid crystal panel is a liquid crystal panel, through which color light having a shortest wavelength enters, among a plurality of liquid crystal panels.

3. The method of driving the display device according to claim 1, wherein
the liquid crystal panel includes a trapping electrode configured to cause ionic impurities in the liquid crystal layer to stay outside a display region, and
a potential is applied to the trapping electrode at least after the temperature of the liquid crystal layer is raised.

4. A display device comprising:
a liquid crystal panel including a liquid crystal layer;
a transmittance measuring device configured to measure a transmittance of the liquid crystal panel; and
a cooling device, wherein,
after a result of measurement of the transmittance by the transmittance measuring device changes by 10% relative to a default value, the cooling device is controlled to raise a temperature of the liquid crystal layer.

5. The display device according to claim 4, wherein
after the result of measurement of the transmittance by the transmittance measuring device changes by 10% relative to the default value, the cooling device is controlled to cause the temperature of the liquid crystal layer to be not less than 60° C. and not more than a nematic-isotropic phase transition temperature Tni-20° C.

6. The display device according to claim 4, further comprising:
a plurality of liquid crystal panels as the liquid crystal panel, light having a different wavelength entering through each of the plurality of liquid crystal panels, wherein
the transmittance measuring device is configured to measure a transmittance of a liquid crystal panel, through which color light having a shortest wavelength enters, among the plurality of liquid crystal panels, and
the cooling device is controlled to raise a temperature of a liquid crystal layer of the liquid crystal panel, through which color light having the shortest wavelength enters, among the plurality of liquid crystal panels.

7. The display device according to claim 6, wherein
a liquid crystal volume ratio V1/V2 of a second liquid crystal panel, through which light having a wavelength shorter than a wavelength of light entering a first liquid crystal panel enters, among the plurality of liquid crystal panels is greater than a liquid crystal volume ratio V1/V2 of the first liquid crystal panel, where V1 is a volume of the liquid crystal at an inner side of a seal material of the plurality of liquid crystal panels, and V2 is a volume of a liquid crystal layer in the display region.

8. The display device according to claim 4, wherein
the liquid crystal panel includes a trapping electrode configured to cause ionic impurities in the liquid crystal layer to stay outside a display region, and
a potential is applied to the trapping electrode at least after a temperature of the liquid crystal layer is raised.

* * * * *